(12) United States Patent
Bishel

(10) Patent No.: US 6,933,686 B1
(45) Date of Patent: Aug. 23, 2005

(54) PROGRAMMABLE AC POWER SWITCH

(76) Inventor: Richard Anthony Bishel, 16020 NW. Ridgetop La., Beaverton, OR (US) 97006

( * ) Notice: Subject to any disclaimer, the term of this patent is extended or adjusted under 35 U.S.C. 154(b) by 9 days.

(21) Appl. No.: 10/754,377

(22) Filed: Jan. 8, 2004

Related U.S. Application Data

(60) Provisional application No. 60/439,167, filed on Jan. 9, 2003.

(51) Int. Cl.[7] .............................................. G05F 1/00
(52) U.S. Cl. ...................... 315/293; 315/297; 315/320; 315/362; 307/115; 307/140
(58) Field of Search ............................... 315/246, 293, 315/295, 297, 307, 313, 314, 317, 320, 322, 315/360, 362; 307/112, 115, 116, 139, 140; 219/240, 490, 507, 508

(56) References Cited

U.S. PATENT DOCUMENTS

| | | | |
|---|---|---|---|
| 4,439,688 A * | 3/1984 | Schornack | 307/115 |
| 4,521,843 A | 6/1985 | Pezzolo et al. | |
| 4,540,984 A | 9/1985 | Waldman | |
| 4,570,216 A | 2/1986 | Chan | |
| 4,649,323 A | 3/1987 | Pearlman et al. | |
| 4,695,739 A | 9/1987 | Pierce | |
| 4,992,709 A | 2/1991 | Griffin | |
| 5,030,890 A | 7/1991 | Johnson | |
| 5,140,255 A | 8/1992 | Tardio et al. | |
| 5,160,831 A * | 11/1992 | Thaler et al. | 219/506 |
| 5,191,265 A | 3/1993 | D'Aleo et al. | |
| 5,191,971 A | 3/1993 | Hakkarainen et al. | |
| 5,248,919 A | 9/1993 | Hanna et al. | |
| 5,262,678 A | 11/1993 | Flowers et al. | |
| 5,336,979 A | 8/1994 | Watson et al. | |
| 5,338,910 A | 8/1994 | Tsai | |
| 5,359,231 A | 10/1994 | Flowers et al. | |
| 5,399,940 A | 3/1995 | Hanna et al. | |
| 5,430,356 A | 7/1995 | Ference et al. | |
| 5,463,286 A | 10/1995 | D'Aleo et al. | |
| 5,481,452 A | 1/1996 | Simmons | |
| 5,485,058 A | 1/1996 | Watson et al. | |
| RE35,220 E | 4/1996 | Johnson | |
| 5,550,463 A | 8/1996 | Coveley | |
| 5,586,048 A | 12/1996 | Coveley | |
| 5,753,983 A | 5/1998 | Dickie et al. | |
| 5,861,720 A | 1/1999 | Johnson | |
| 5,872,832 A * | 2/1999 | Bishel et al. | 379/39 |
| 6,356,038 B2 * | 3/2002 | Bishel | 315/291 |
| 6,380,696 B1 | 4/2002 | Sembhi et al. | |
| 2002/0050799 A1 | 5/2002 | Yamauchi et al. | |

* cited by examiner

Primary Examiner—Haissa Philogene
(74) Attorney, Agent, or Firm—Richard A. Bishel

(57) ABSTRACT

An AC controller provides programmable switching of AC power flow, together with producing a source of DC power for the AC controller. The AC controller is connected in series with only one side of the AC power source and the AC load, and uses a microcontroller or a Programmable Logic Device (PLD) for the programmable capability. The AC controller can be programmed to provide a light flasher function, a time delay off function, an automatic fade function, a dimming function, a burglar deterrent function, and a time delay dim function. With a multiple-position switch replacing a current wall switch, the operator can easily select many pre-programmed functions.

30 Claims, 27 Drawing Sheets

PROGRAMMABLE AC POWER SWITCH

RELATED APPLICATIONS

Provisional application No. 60/439,167 filed on Jan. 9, 2003.

FIELD OF THE INVENTION

This invention relates to AC electric current control systems, such as motor controllers and illumination switches.

BACKGROUND OF THE INVENTION

Wall-mounted switches that provide capability to accomplish other functions than just on/off function are more desirable in that they provide more convenience, increase safety, and save energy. Wall-mounted switch controllers, which include dimmers, time-delay devices, variable intensity, motor controllers, and timers, are designed as dedicated devices that perform one function and usually are designed where full line power is available. If not available, then additional wiring is needed. Some of the current programmable switch controllers such as 24 hour timers required significant learning to program the features and lose their programmed functions upon loss of electrical power.

U.S. Pat. No. 4,570,216 describes a programmable switch that the user must input instructions to have the device perform its task. Usually the device is use as a timer in electrical switch box. The user interface is unique and requires extensive training to perform the task. The proposed design does not allow replacing an in-line switch since the AC power and electrical load are on the hot side and the proposed design is connected between the electrical load and ground. Current wiring practices have the wall-mounted switch wired between the hot side of AC power and the electrical load. The loss of power would require re-programming the device.

U.S. Pat. No. 5,753,983 describes a multi-function switch that fits in a standard junction box, but it has a unique user interface that requires extensive training to utilize its capabilities. The user interface relies on a conventional rocker-type actuator to input the commands to the device. The user needs to perform a sophisticated keying sequence to change the function. A user would easily be frustrated if he/she inputs an invalid sequence since the preferred embodiment of the device rejects such input. The lost of power for any length of time would require re-programming the device. This occurs anytime the light bulb is changed.

U.S. Pat. No. 5,262,678 describes a switch/dimmer assembly that provides an ON/OFF switching and a slider for controlling the amount of power to dim the light or control the motor speed. The device performs only a single function: either dimming of the light or controlling the motor speed. It has no multi-function capability or programmed intelligence. There is no DC power to control power control circuitry. It uses conventional dimming or speed controlled circuitry: a potentiometer controlling the firing angle of the triac.

U.S. Pat. No. 4,695,739 describes a multi-function lamp circuit where the device is mounted at the electrical load and a conventional single-pole, single-throw toggle switch located in the electrical wall box is used to change the function. The number of times the switch changes states determine the desired function. The user would need to learn this sequence and input the sequence every time the user wants a desired function. This not only requires extensive training, but also requires time for inputting the sequence especially if the desired function requires several state changes.

The disadvantages of the prior art are as follows:
  a. Unique and extensive learning is required to re-program the functions.
  b. The user interface for selecting the desired function is too complicated.
  c. There is only a single function besides on/off function such as dimming or speed control.
  d. The loss of power requires reprogramming.
  e. There are more and higher cost components.

Accordingly, there has heretofore existed a need for an inexpensive and effective system for providing an AC power controller which provides multiple functions and does no require complicated user interface.

SUMMARY OF INVENTION

The present invention provides a highly versatile programmable multi-function switch controller. One object of the present invention is to provide multi-function switch operation capability and be installed between an AC electrical load such as a light and the source of AC power.

Another object of the present invention is that it can be easily installed in a standard electrical wall box and covered by standard wall plates. There is no need for specialized wall boxes or wall plates, but they can be used with present invention.

Another object of the present invention is to provide simple user control/s that is easy to access in order to select the desired function. One embodiment utilizes a single multi-position electrical switch which is easy to access and easy to select the desired function. Unlike prior art which requires programming and re-programming, the user can easily see which function is selected by the position of the switch.

Another object of the present invention is provide the capability to program other functions for a more sophisticated user and loss of AC power does not lose the functionality unlike prior art.

Another object of the invention is to use a rotary switch for selecting the desired function including the OFF position. There would be many pre-programmed functions into the device such as random ON and OFF function, continuous dimming function, energy saver function, flashing function, and time delay OFF function to name a few. The rotary switch is similar to dimmer controls and would fit in a standard electrical wall box and covered with standard wall plate. The position of the rotary switch would indicate which function the device would perform.

Another object of the invention is to use a slider switch for selecting the desired function including the OFF position.

Another object of the invention is to use any type of multiple-position switch for selecting the desired function.

DESCRIPTION OF INVENTION a. AC Power Control Circuit

Figure 1:
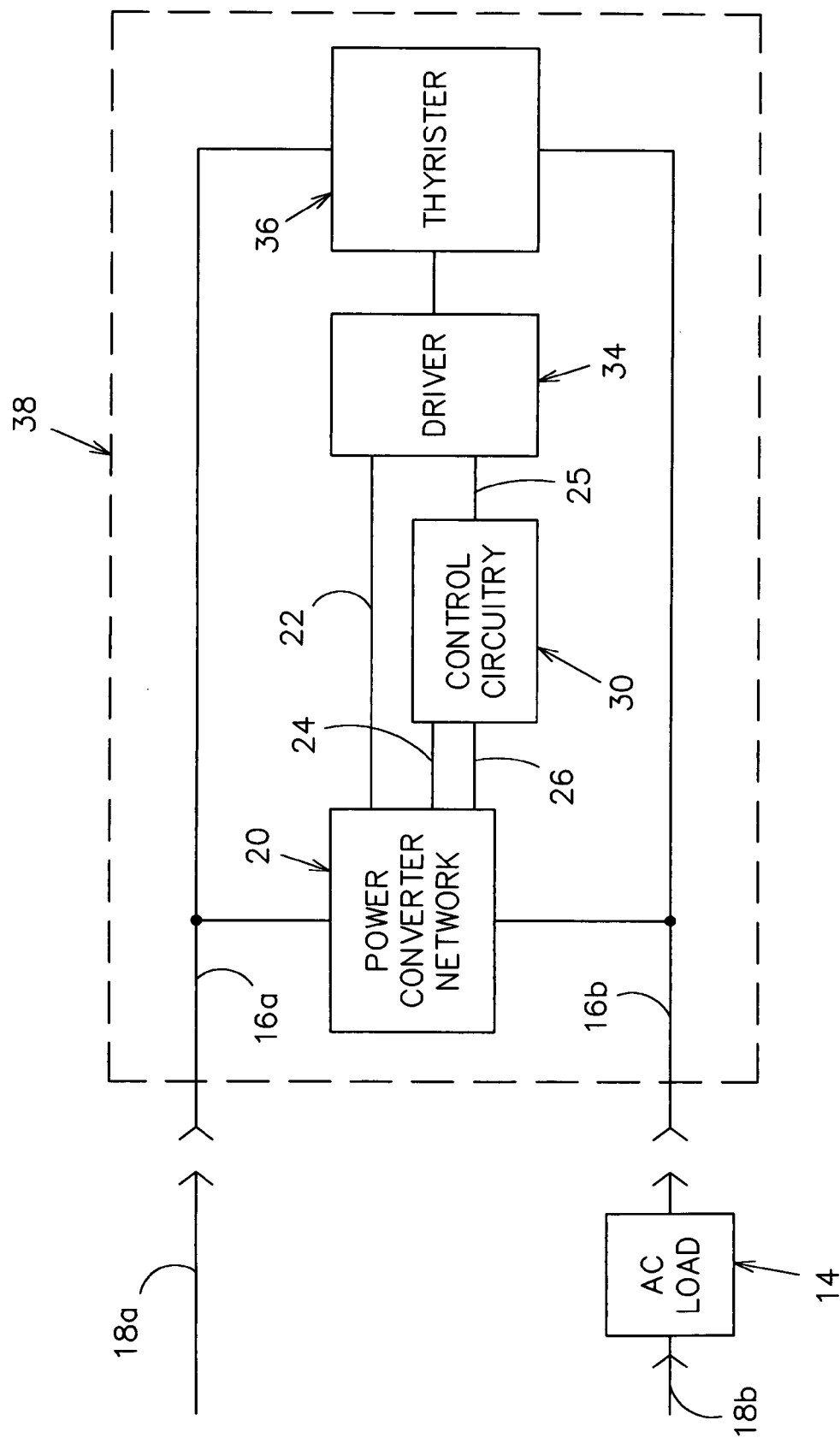
FIG. 1 is a block diagram showing the AC power control circuit for use in the switch of the present invention.

FIG. 1 shows a block diagram schematic of the AC power control circuit 38 in which AC power from AC source 18a and 18b is applied to load 14 under control of series power control circuit 38. The AC power control circuit 38 includes a thyristor 36, the power network 20, a thyristor driver 34, and the control circuit 30. The power network 20 provides low voltage through lines 24 and 26 continuously to operate the control circuit 30 and the necessary drive current pulse when needed by the thyristor driver 34 via lines 22 and 25. The thyristor driver 34 provides the necessary gate current pulse to turn the thyristor 36 ON.

A thyristor 36 is a semiconductor power switch that allows high current AC or DC to flow when trigger by a gate current pulse. Two types of thyristors are SCRs (Silicon-Controlled Rectifiers), and TRIACs (TRIode AC switches).

Figure 2:
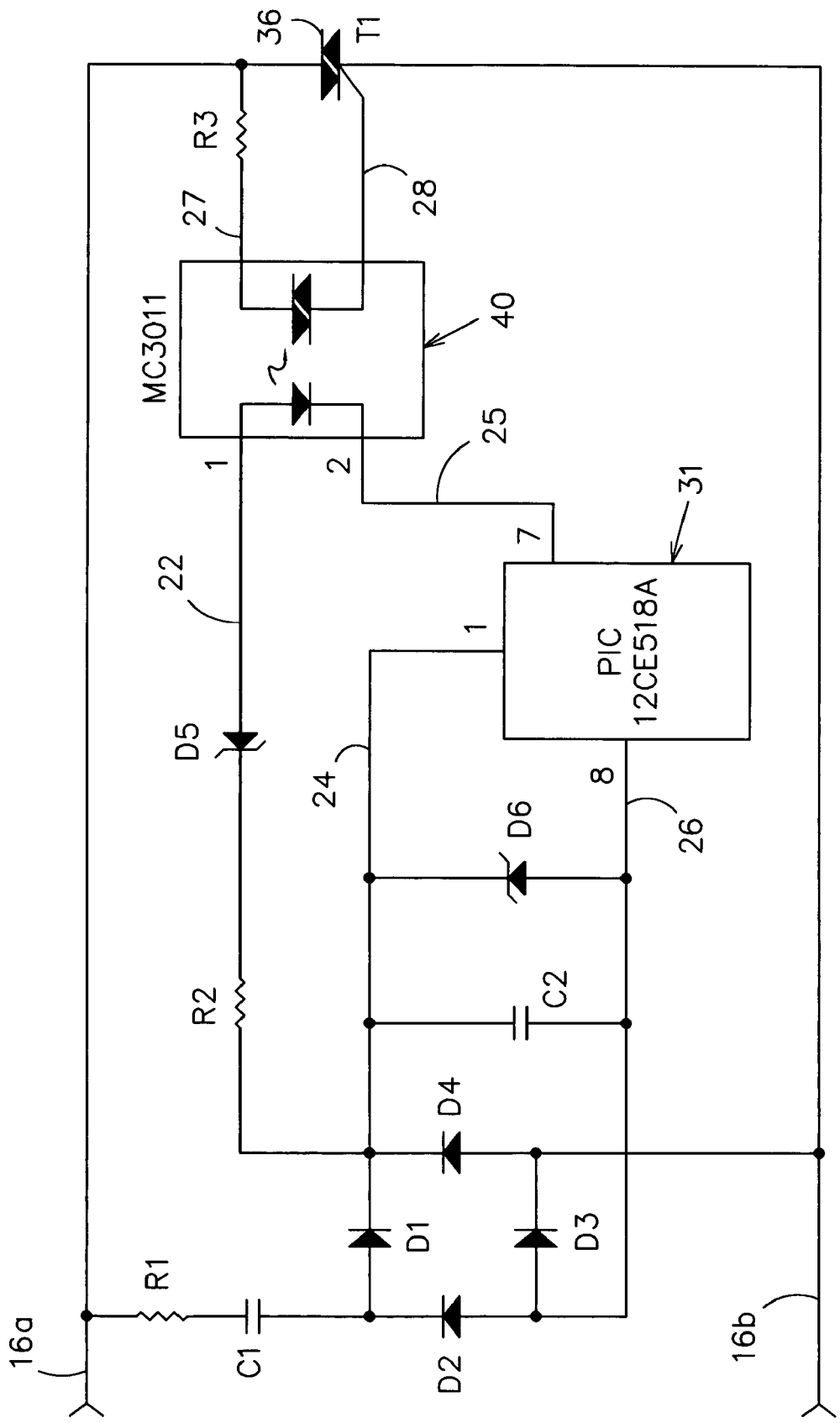
FIG. 2 is an schematic diagram showing the AC power control circuit of FIG. 1.

FIG. 2 shows an electrical schematic of one version of the AC power control circuit 38 illustrated in FIG. 1. Here, the control circuit uses a microcontroller 31. Programmable Logic Devices (PLDs) such as Programmable Array Logic circuits (PALs) and Application-Specific Integrated Circuits (ASICs) can also be used for the control circuit. Each block of FIG. 1 is represented by electronic components. In this circuitry, the power network 20 provides the continuous power to the microcontroller 31 shown as a Microchip PIC 12CE518A which contains the user programmable memory (EEPROM). The circuit includes R1 and C1, which minimizes the current and voltage to acceptable level. Diodes D1, D2, D3, and D4 convert AC power to DC power. Diode D6 is a zener diode, which keeps the voltage level on lines 24 and 26 to an acceptable level for the microcontroller 31. Capacitor C2 maintains the current to the microcontroller 31 during the times when the AC power is not provided. The thyristor driver circuitry includes resistor R2, diode D5, an optoisolator triac driver 40 shown as a Motorola MC3011, and resistor R3. To enable the triac driver, the microcontroller 31 allows a minimum current pulse to flow through line 25. The output lines 27 and 28 of the triac driver 40 close the path from resistor R3 to the gate of the thyristor 36. This provides a gate current pulse to the thyristor 36, which causes the thyristor to conduct and be in an ON state. Once the thyristor 36 is ON, there will be no more current flowing to the control circuitry via lines 16a, R1, and C1. The thyristor 36 stays ON until the AC voltage across terminals 16a and 16b goes to zero, which happens every half cycle.

The minimum current pulse to trigger the thyristor driver which triggers the thyristor is provided by the power network circuitry via R1, C1, the diodes D1–D4, resistor R2, and diode D5 through the output line 25 of the microcontroller 31. Resistor R1, capacitor C1 and resistor R2 limit the current to the thyristor driver 40. D5 provides a minimum level of voltage to line 24 so that the microcontroller 31 has sufficient DC power during the time when it output drives the thyristor driver 40 continuously ON. Diode D5 can be eliminated in configurations where the microcontroller monitors the zero crossings and provides the necessary gate current pulse for the minimum duration needed to trigger the thyristor or when R2 is high enough value that the current draw from C2 is minimal.

b. Cycle-Stealing

Figure 3A:
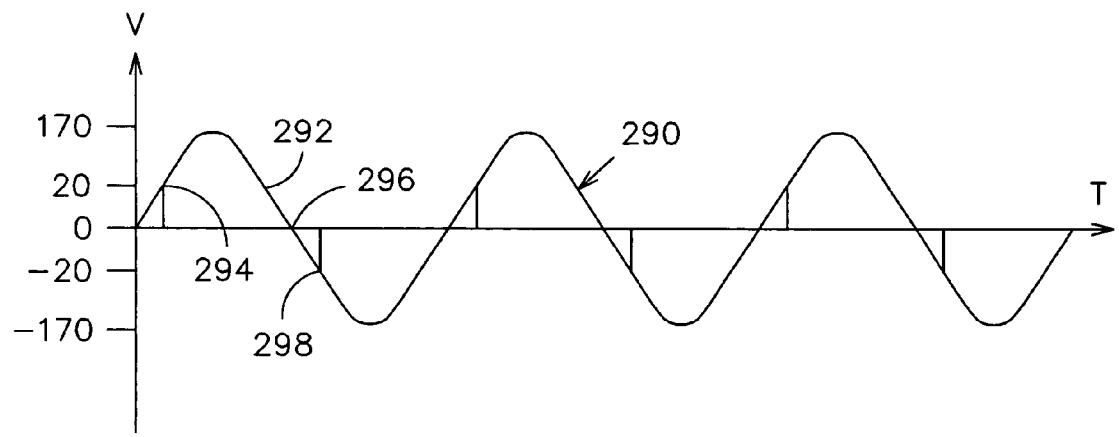
FIG. 3A is a graphical plot of an AC waveform across the AC power control circuit of FIGS. 1–2, when the unit is in an OFF state.
Figure 3B:
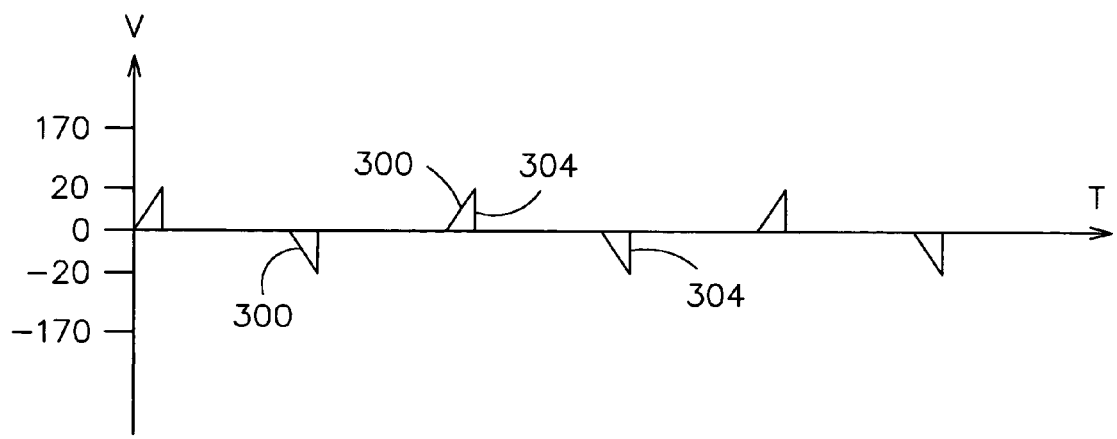
FIG. 3B is a graphical plot of an AC waveform across the AC power control circuit of FIGS. 1–2, when the unit is in an ON state.

FIGS. 3A and 3B illustrate the AC waveforms appearing across lines 16a and 16b of FIG. 2 during an ON and OFF actuation. In the OFF situation, the thyristor is not provided any gate current pulses and the voltage across lines 16a and 16b is the same as the applied waveform. During this time, there is sufficient current supply whenever the voltage is above 294 for the internal circuitry. The internal voltage on lines 24 and 26 is clamped by diode D6 in FIG. 2 to provide an acceptable source of DC power for control circuitry 30.

In a fully ON situation, the thyristor is enabled when the instantaneous voltage 300 across the thyristor 36 provides enough power 304 to the internal circuitry both for the microcontroller and for enabling the driver 40 to provide the gate current pulse. FIG. 3B shows the voltage across lines 16a and 16b when the thyristor is in an ON state. At the beginning of each AC half cycle, a small portion of the AC power is stolen and used by the internal circuitry. When the voltage reaches a level to supply the necessary current to trigger the thyristor driver and therefore the thyristor, the thyristor is turned ON providing a low impedance path for the AC current. The low impedance path provides power to the AC load 14 through the thyristor 36.

From FIG. 1, the invention utilizes the AC power source from a wire lead 18a to control the AC load 14. The invention is connected in series with the AC power source 18a and the load 14 via first and second leads, 16a and 16b. The thyristor 36 is in series with the leads, 16a and 16b, and controls the flow of AC current to the load 14 in response to activation of the thyristor 36 by a gate current pulse. The gate current pulse is produced by the driver 34. The driver 34 is selectively controlled by the control circuitry 30. The control circuitry 30 obtains its DC power from the power converter network 20. The power converter network 20 is coupled between first and second leads, 16a and 16b. The power converter network 20 adapts or steals a portion of the AC current at the beginning of each half cycle of the AC current and converts the AC current into a source of DC current for the control circuitry 30.

c. Power Network

Some examples of different power networks that will supply DC power to the cycle-stealing device.

Figure 4:
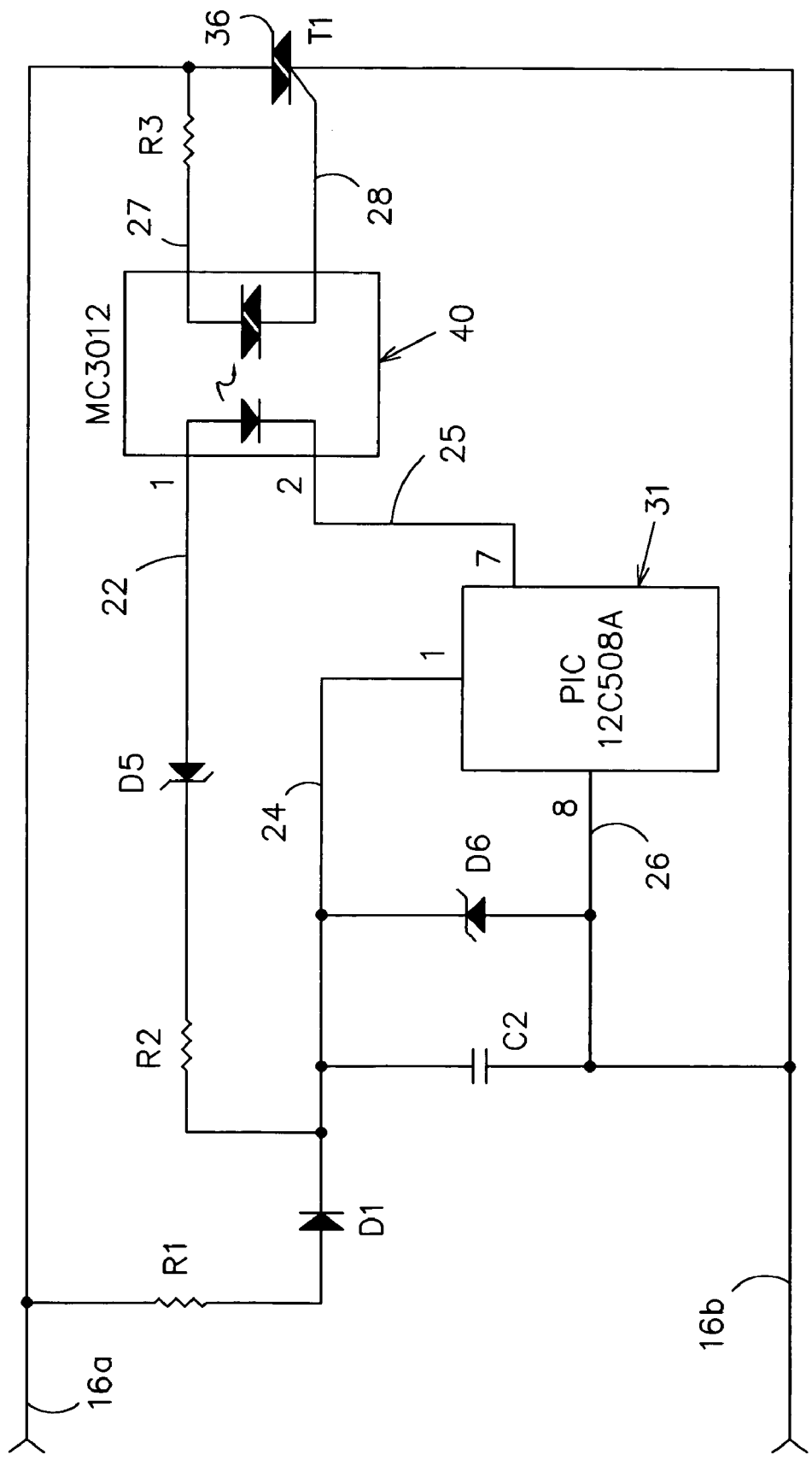
FIG. 4 is a schematic diagram showing an AC power control circuit in accordance with an embodiment of the present invention that derives DC power using half-wave rectification and a resistor.

FIG. 4 shows a second embodiment, where the power conversion network includes resistor R1 and diode D1 instead of R1, C1, and diodes D1–D4. Here, the resistor R1 has a larger power rating to handle the current flow needed for the microcontroller 31 and thyristor driver 40. In order to minimize the current, this circuit uses a thyristor driver 40 with a more sensitive internal LED such as the Motorola MC3012. Diode D1 only provides power on every positive-going AC cycle.

Figure 5:
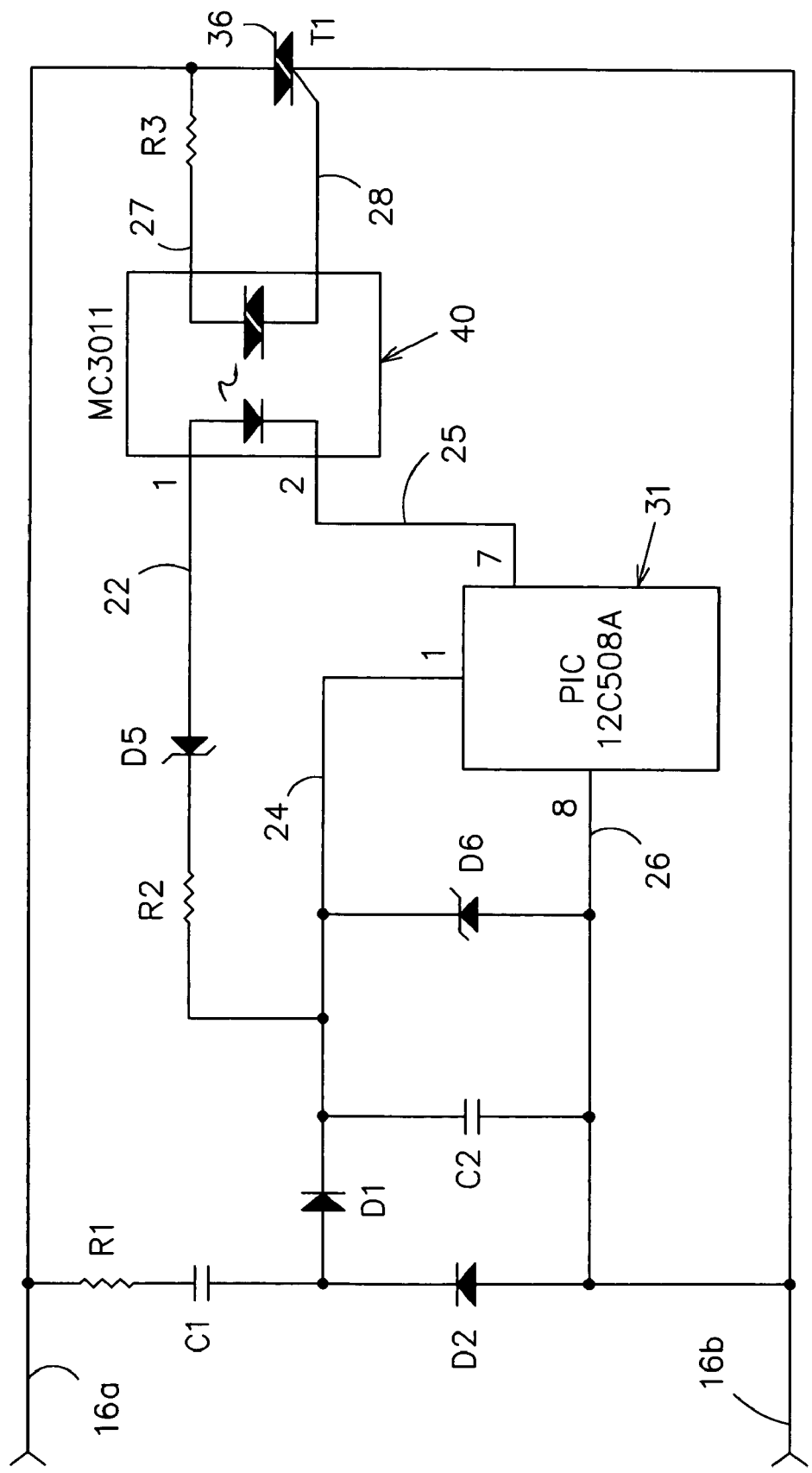
FIG. 5 is a schematic diagram showing an AC power control circuit in accordance with an embodiment of the present invention that derives DC power using half-wave rectification and a capacitor.

FIG. 5 shows third embodiment where the electrical circuit uses a capacitor C1 and a smaller value for R1 to provide the needed power. Diode D2 is needed for allowing the AC voltage to charge and discharge capacitor C1. The DC power is derived from the AC power only on positive going AC cycles.

d. Thyristor Driver

Figure 6:
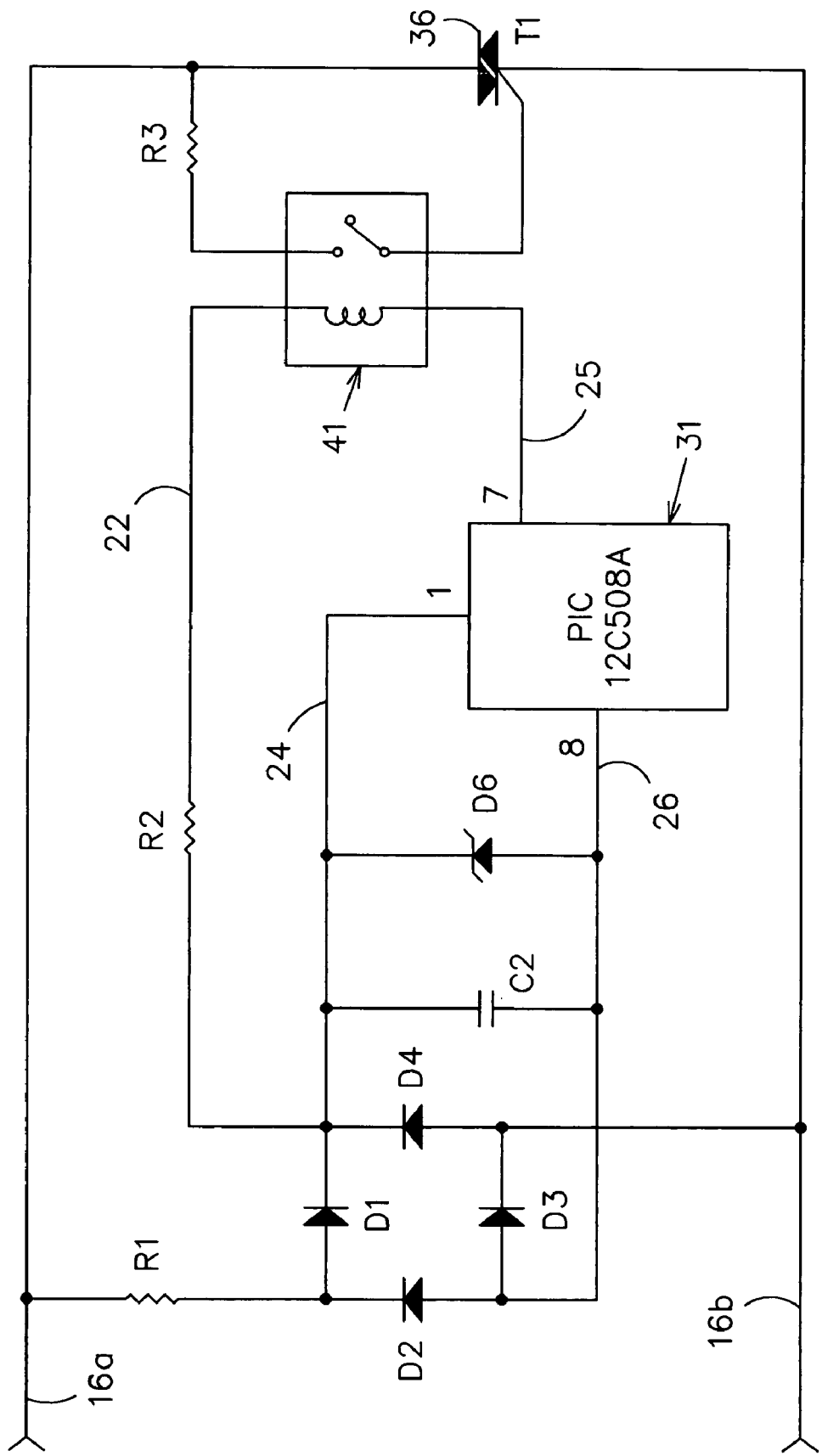
FIG. 6 is a schematic diagram showing an AC power control circuit in accordance with an embodiment of the present invention that using a relay for the thyristor driver.

FIG. 6 illustrates another embodiment of the device using a relay 41 such as 12 VDC reed relay, Radio-Shack No. 275-233, instead of an optoisolator driver 40 in the circuitry. D5 is not needed because R2 and the resistance of the relay coil are large enough to minimize loading of the power network.

Figure 7:
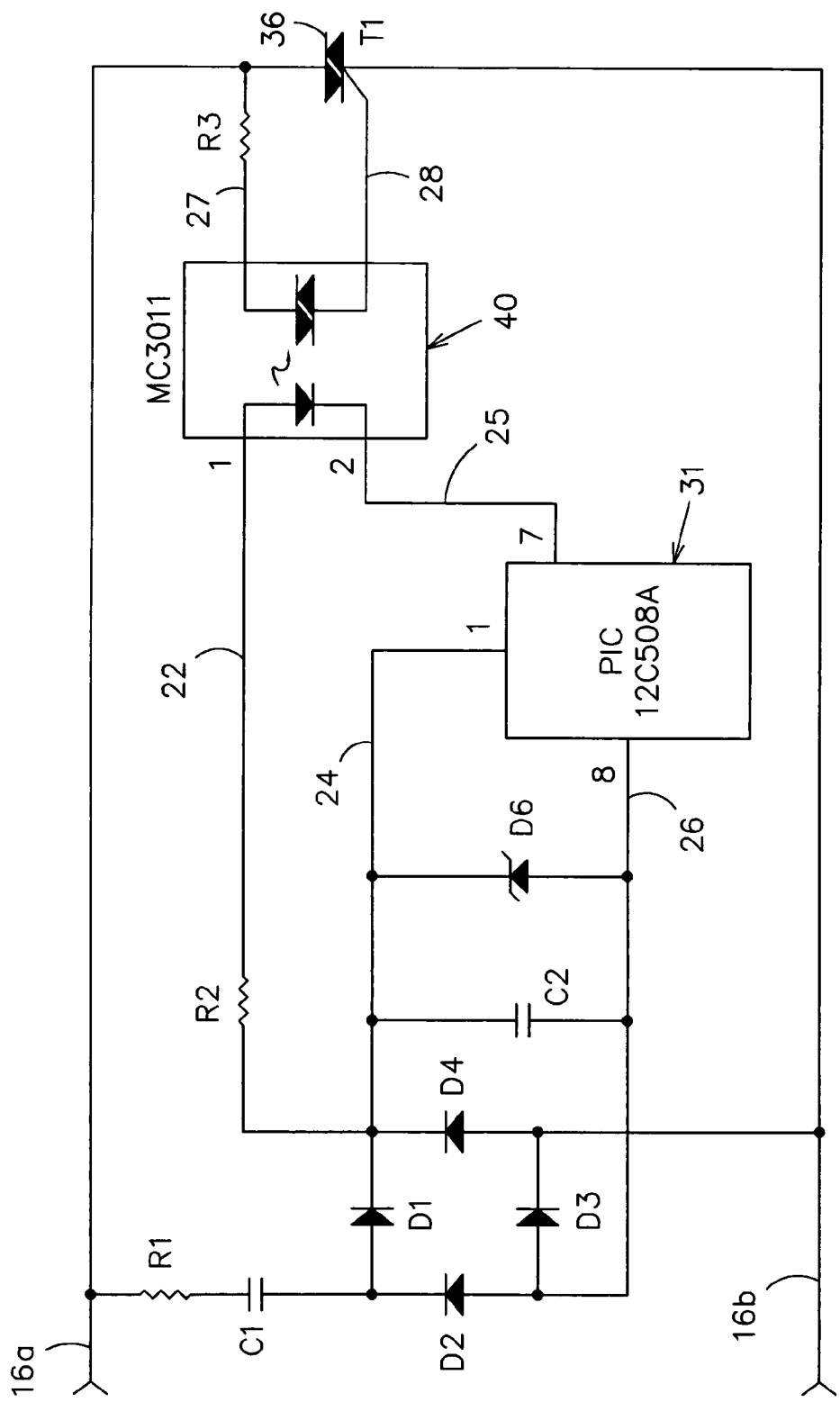
FIG. 7 is a schematic diagram showing an AC power control circuit in accordance with an embodiment of the present invention that using an optoisolator for the thyristor driver and larger value for resistor R2.

FIG. 7 illustrates another embodiment of the device using an optoisolator driver 40 with only a higher value resistor R2. With this circuitry, the AC voltage across leads 16a and 16b will be much higher to produce the necessary drive current for the optoisolator driver 40. To minimize the drive current, a more sensitive optoisolator driver such as Motorola MC3012 would be used.

Figure 8:
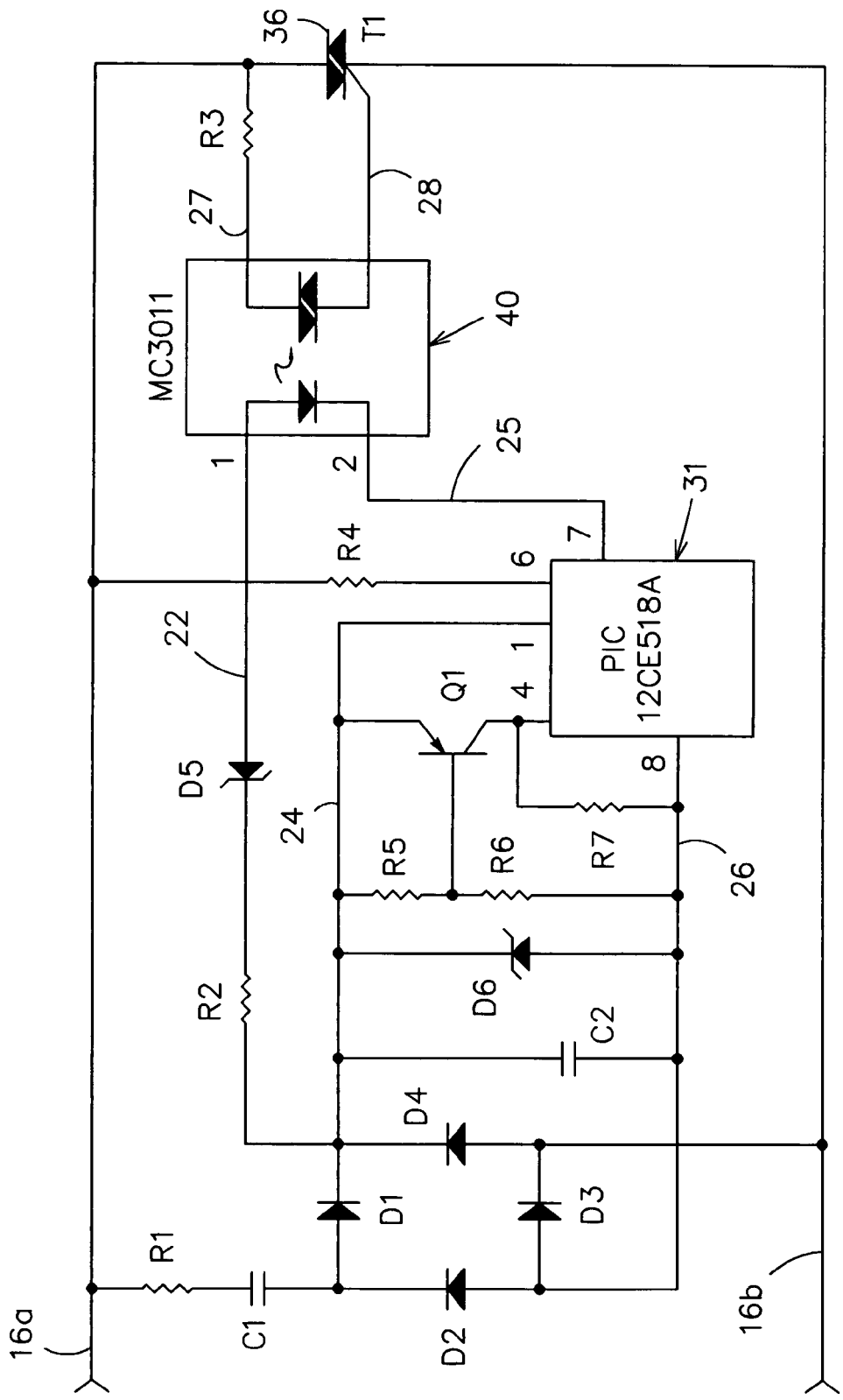
FIG. 8 is a schematic diagram showing an AC power control circuit in accordance with an embodiment of the present invention that using a zero crossing detector to determine when to when to trigger the thyristor driver, and programmable non-volatile memory.

FIG. 8 illustrates another embodiment of the device using the smaller value resistor R2 but includes another resistor R4 to detect the zero crossing of the AC voltage. The microcontroller 31 is programmed to pulse line 25 long enough to provide sufficient gate current pulse to trigger the triac T1. With this circuitry, the AC voltage across leads 16a and 16b will be significant smaller than in circuit of FIG. 8. With smaller AC voltage waveform, a lower EMI (ElectroMagnetic Interference) can be achieved. Also, Resistors R5, R6, R7, and transistor Q1 provide a reset pulse when the voltage drops below a certain level which occurs when the power is turned OFF. This combination allows for a longer period for the microcontroller 31 to be in reset condition before the microcontroller's RAM memory is no longer valid.

e. Control Circuitry

Figure 9:
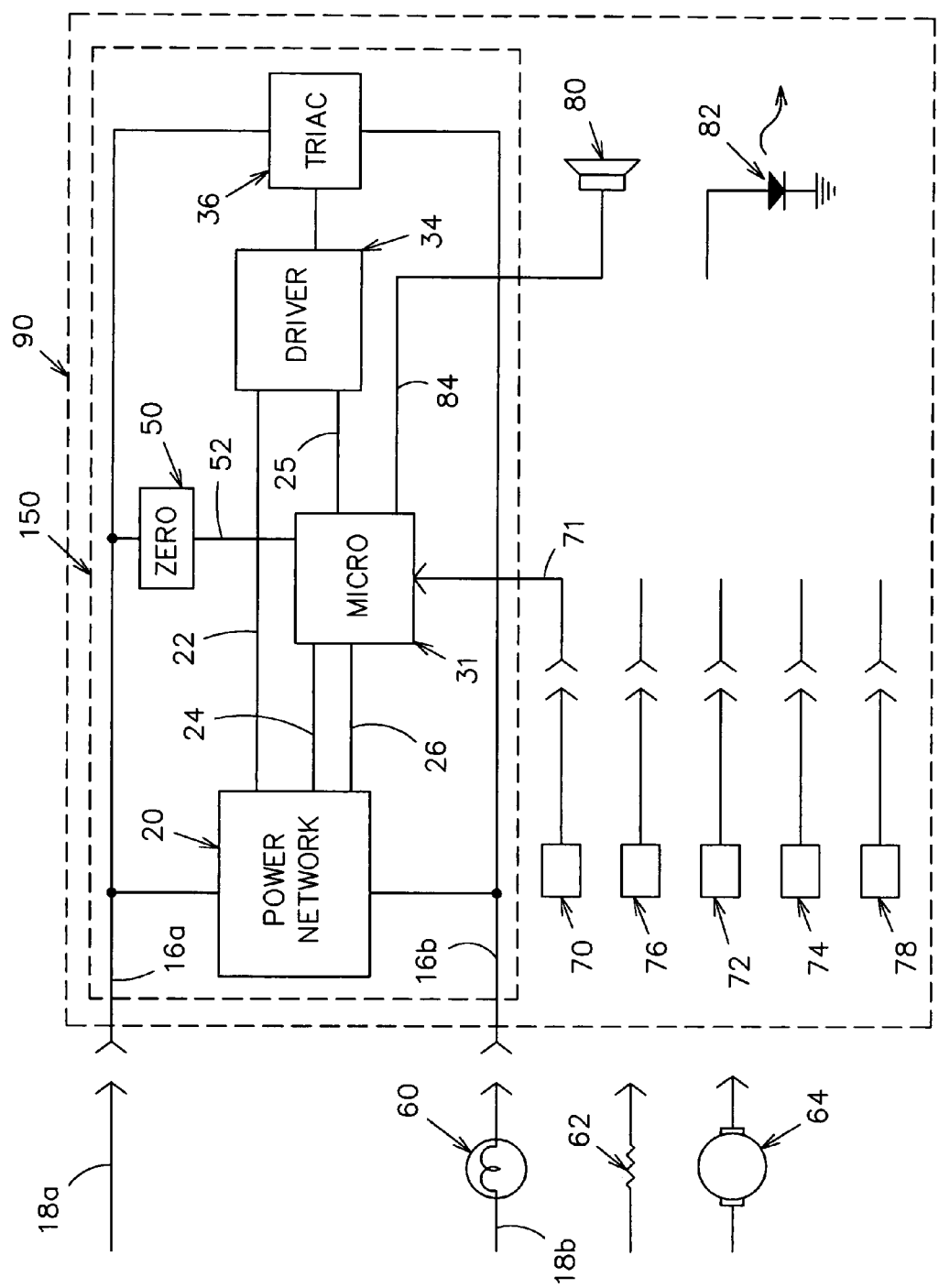
FIG. 9 is a block diagram showing an AC power control circuit in accordance with an embodiment of the present invention which incorporates a microcontroller having the capability of receiving different sensors and driving different AC loads.

FIG. 9 shows different embodiments of the control circuitry 30 of FIG. 1. FIG. 9 shows the microcontroller 31 with various inputs from different sensors such as a motion sensor 70, temperature sensor 76, smoke detector sensor 72, burglar switch 74, mode selection switches 78, and a zero crossing detector 50. Also, FIG. 9 shows the microcontroller 31 driving a speaker 80 or LED 82 from its outputs in addition to driving the thyristor driver 34. The AC power controller 90 can drive lights 60, resistive loads 62, and motors 64. The microcontroller can be programmed to turn on the light when it detects motion in the room or turn on the heater motor when the temperature is low. The AC power controller 90 contains the control logic circuitry 150 with sensor inputs, line 71, and device outputs, line 84.

Figure 10:
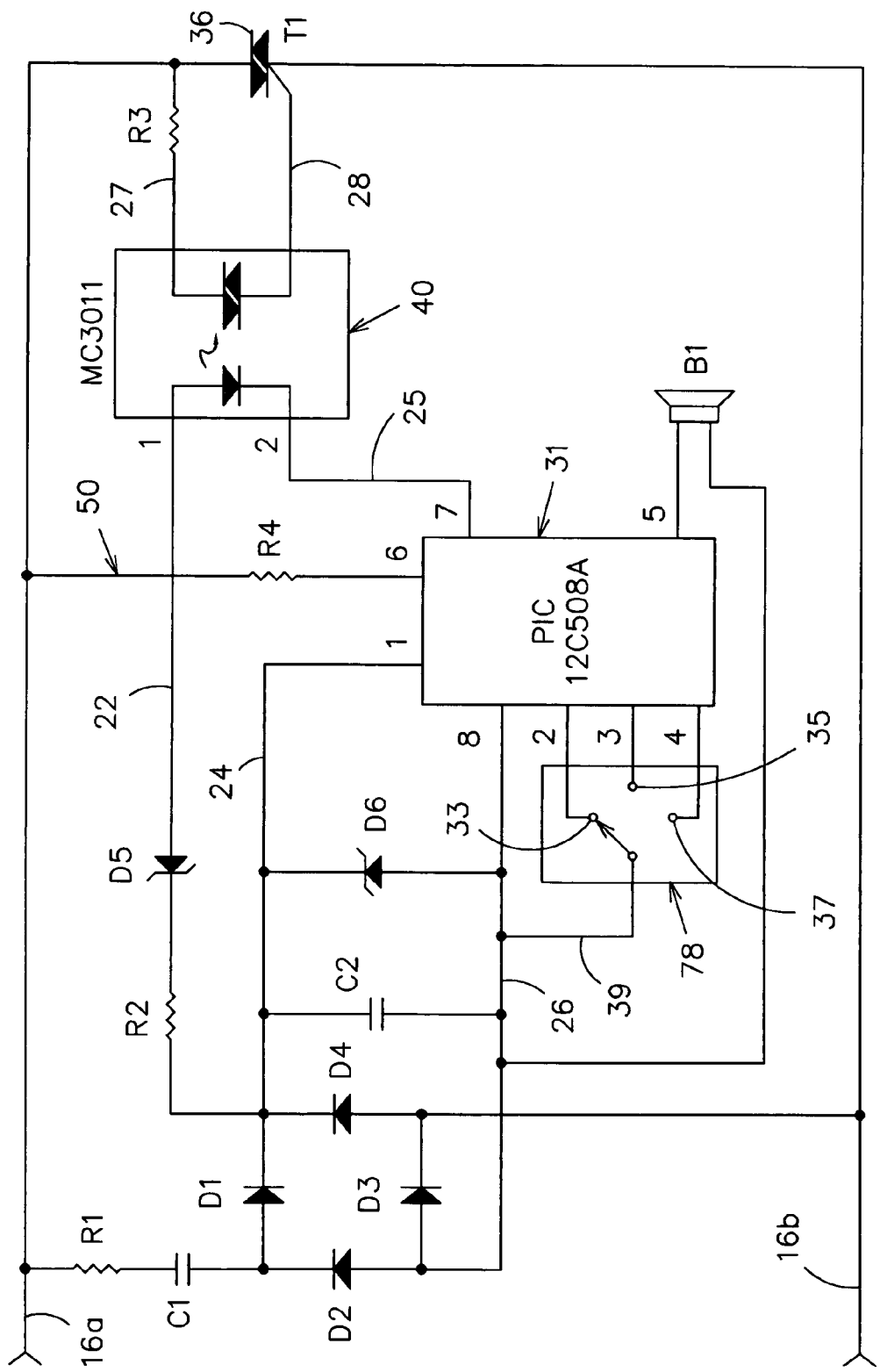
FIG. 10 is a schematic diagramming the AC power control circuit of FIG. 9 with zero-crossing detector and mode selection functions.

FIG. 10 shows an electrical circuit similar to FIG. 9 but with only the zero-crossing detector circuitry 50, mode selection switch 78, and a speaker B1. The zero-crossing detector circuitry uses resistor R4 to limit the current into the microcontroller 31. The microcontroller 31 contains internal diodes, which limits the AC voltage to microcontroller supply voltage line 24 and supply return, line 26. Since the zero crossings are detected, the microcontroller only needs to turn on the driver for a short time to enable the gate current pulse. FIG. 10 also shows the mode selection switch 78 which is shown as a multi-position switch. The mode selection switch 78 would connect the supply return line 26 via line 39 to one of the inputs, via lines 33, 35, and 37, of the microcontroller 31. Each position of the mode selection switch 78 would indicate to the microcontroller 31 to operate a different program. With a different program, the AC power controller 90 would perform a different operational function on the attached electrical load. Line 39 could also be connected to supply voltage line 24 instead of line 26. The microcontroller 31 would be programmed to accept the inverse logic via the mode selection switch 78 for selecting the mode. Also, line 39 could be attached to line 16a via a resistor instead of line 26. In this configuration, the microcontroller 31 would detect the AC voltage on the input lines 33, 35, and 37 to determine the mode selection switch 78 position.

Figure 11A:
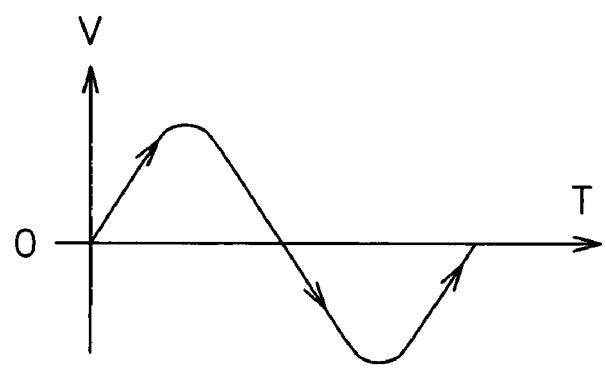
FIG. 11A is a graphical plot of an AC voltage waveform across the AC power control circuit of FIG. 10 when the device is OFF state.
Figure 11B:
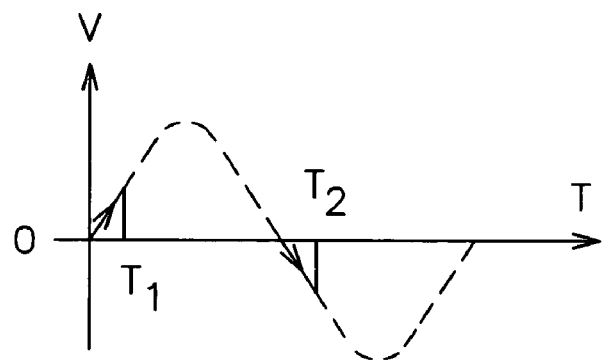
FIG. 11B is a graphical plot of an AC voltage waveform across the AC power control circuit of FIG. 10 when the device is ON state.
Figure 11C:
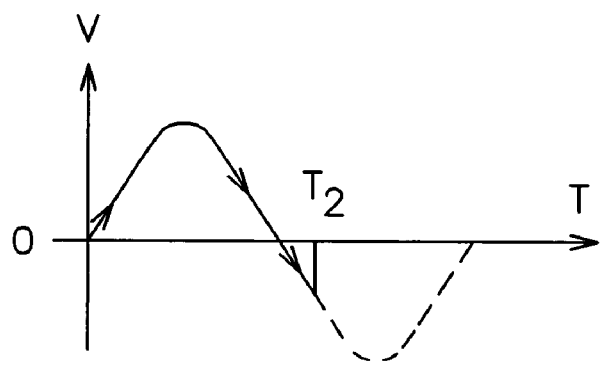
FIG. 11C is a graphical plot of an AC voltage waveform across the AC power control circuit of FIG. 10 when the device is ON state for only half of the AC cycle.
Figure 11D:
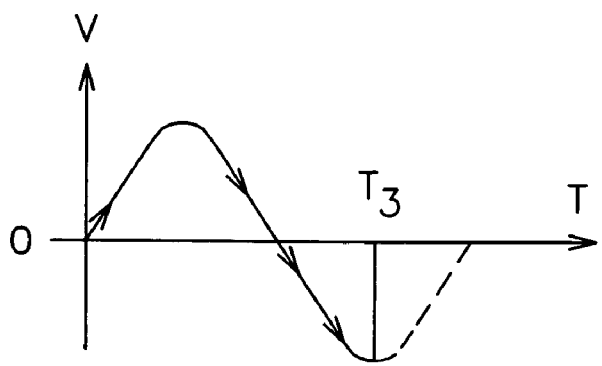
FIG. 11D is a graphical plot of an AC voltage waveform across the AC power control circuit of FIG. 10 when the device is ON state for only a quarter of the AC cycle.

FIGS. 11A, 11B, 11C, and 11D are a graphical plot of variable AC voltage triggered at different points on the AC cycle. The device is triggered by providing the gate current pulse after detecting the zero crossing. FIG. 11A shows when the zero crossing detected at time T0. FIG. 11B illustrates the voltage across the thyristor when the AC load is powered at time T1 and T2 after stealing a portion to power the microcontroller 31 and providing the gate current pulse. In FIG. 11B, the AC load such as a light 60 would be ON state. FIG. 11C illustrates that the load is not powered until time T2 and only a half cycle of power is applied to the load. If the AC load were a light, the light would dim to about half brightness. FIG. 11D shows that the load is not powered until time T3 and only a portion of the half cycle is applied to the load. In FIG. 11D, the AC load would only receive portion of the AC power. The microcontroller 31 can be programmed to provide power to the load at any time for any duration.

f. Controller's Program

Figure 12:
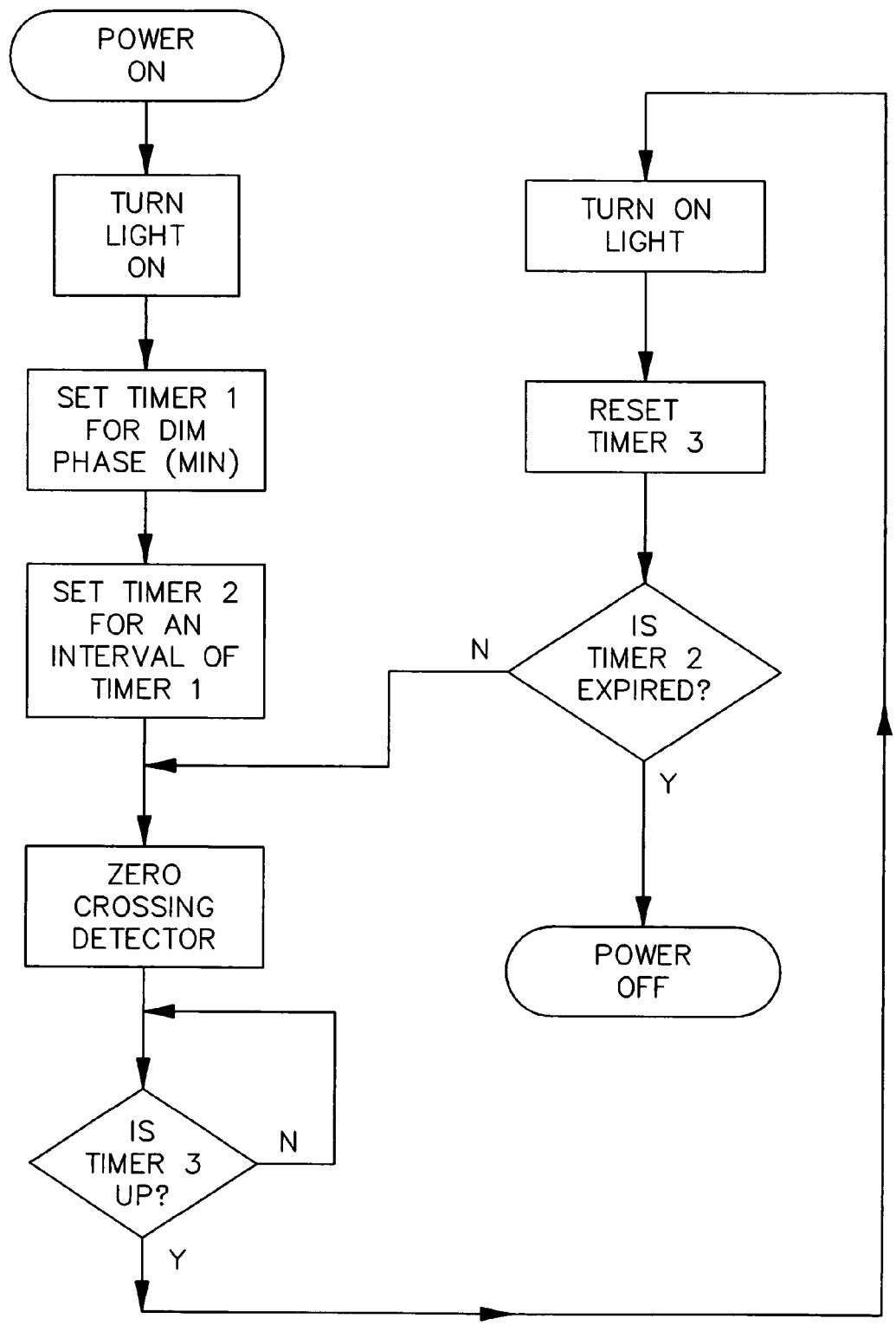
FIG. 12 is a graphical flowchart of the program of the device in FIG. 10 for continuous dimming an AC lights from ON to OFF over a period of time.
Figure 13:
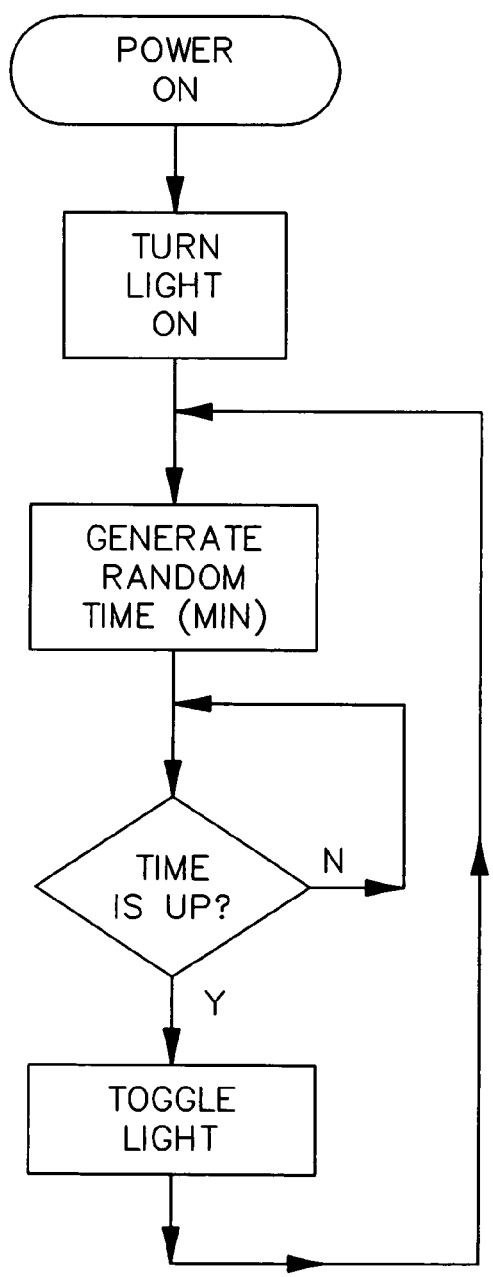
FIG. 13 is a graphical flowchart of the program of the device in FIG. 10 for randomly turning an AC load ON and OFF over a period of minutes and hours.
Figure 14:
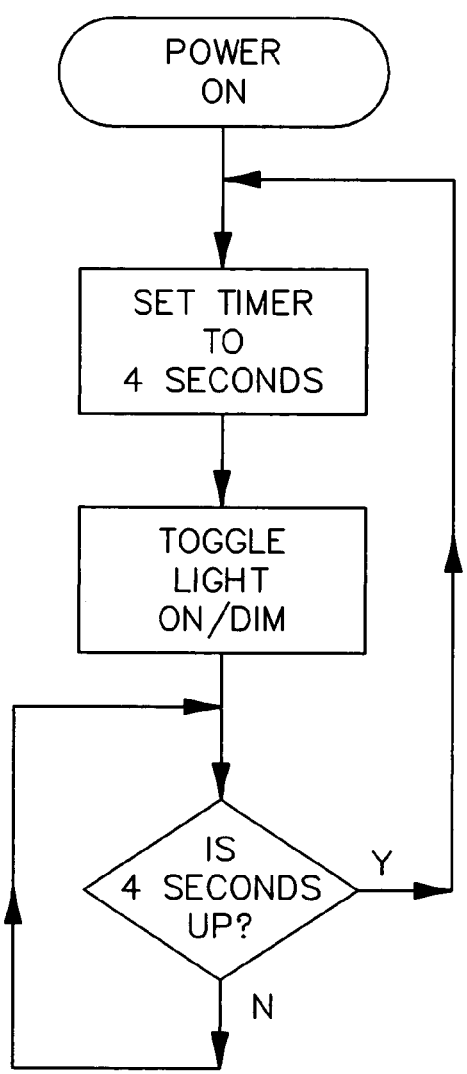
FIG. 14 is a graphical flowchart of the program of the device in FIG. 10 for flashing a light between ON and DIM.
Figure 15:
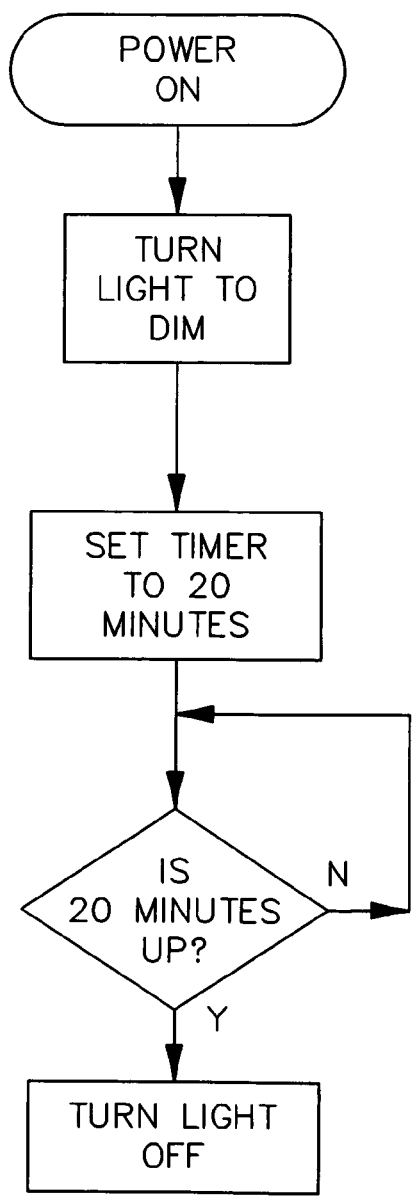
FIG. 15 is a graphical flowchart of the program of the device in FIG. 10 for dimming the lights for period of time and then turning the lights to an OFF state.
Figure 16:
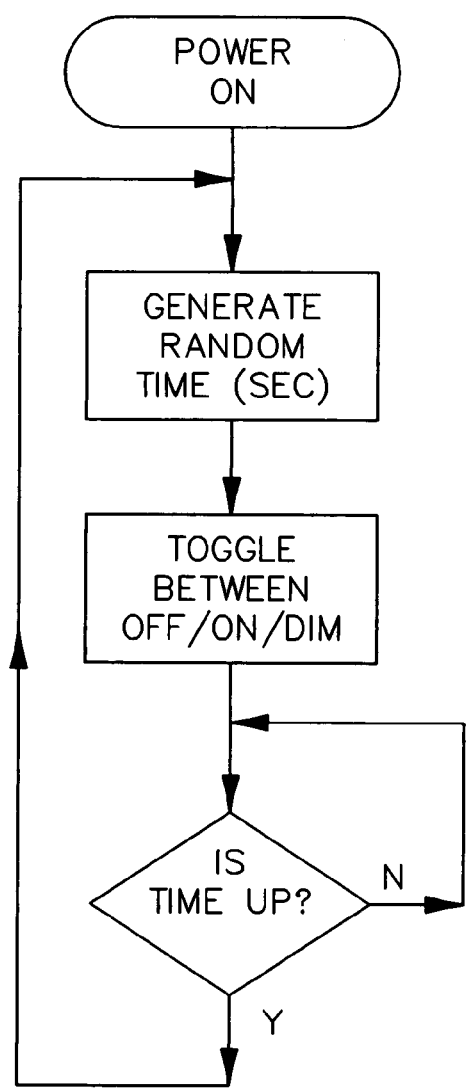
FIG. 16 is a graphical flowchart of the program of the device in FIG. 10 for randomly turning the light to an ON state, an OFF state, and a DIM state at a high flash rate.
Figure 17:
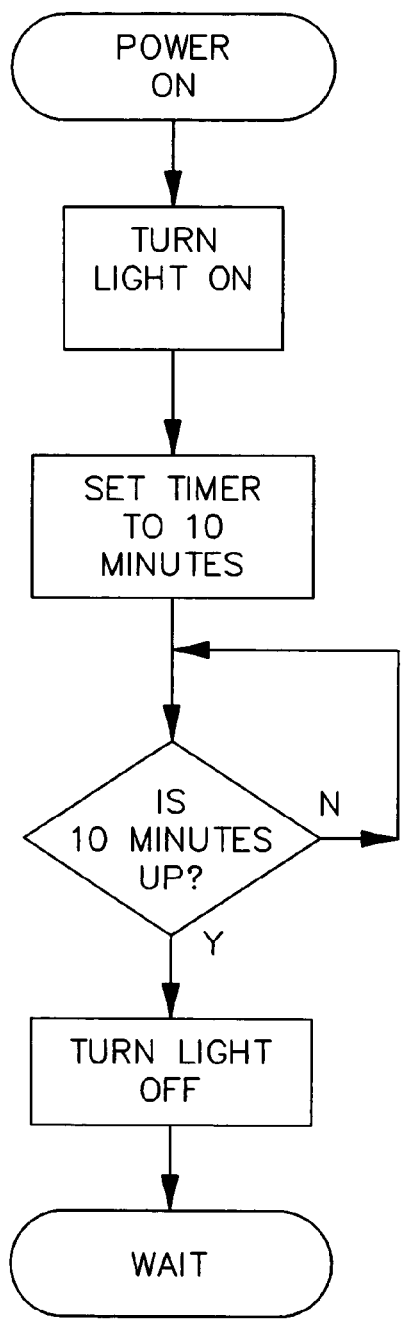
FIG. 17 is a graphical flowchart of the program of the device in FIG. 10 for turning the lights to an OFF state after a period of time.
Figure 18:
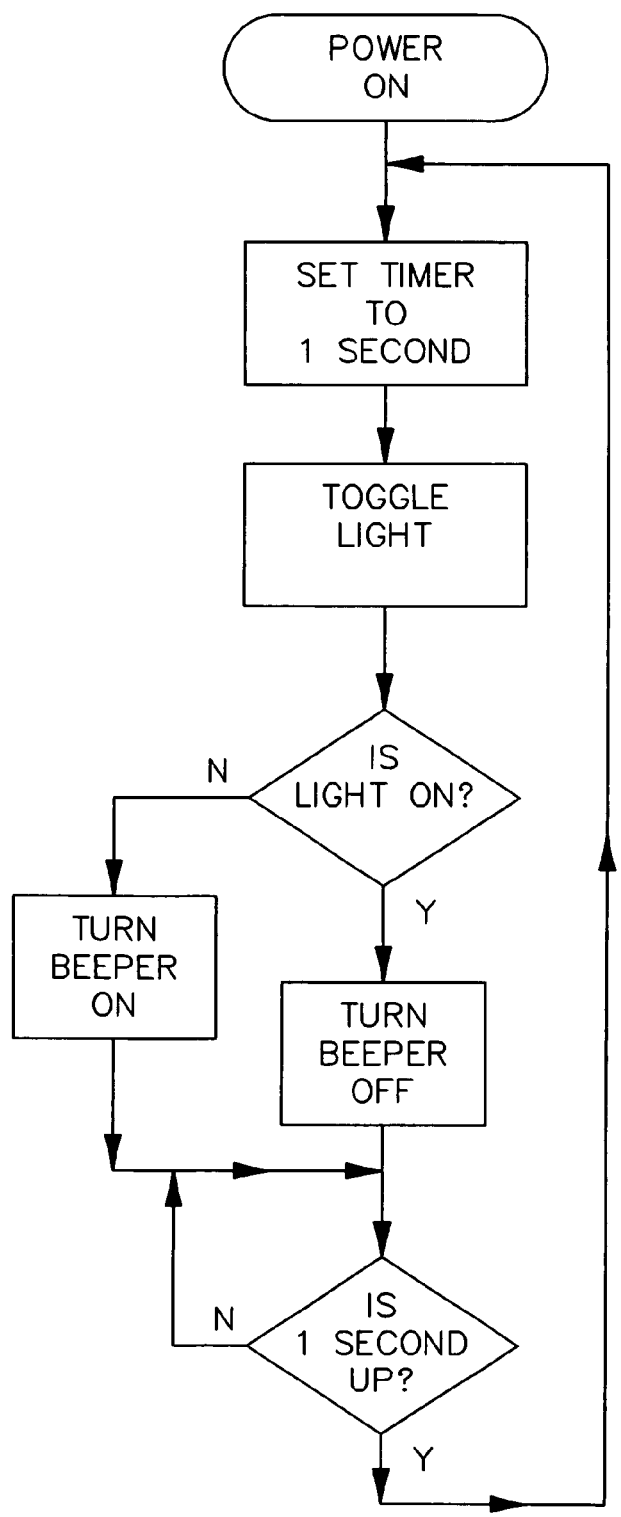
FIG. 18 is a graphical flowchart of the program of the device in FIG. 10 for flashing the light to an ON and OFF states, and sounding a beeper.
Figure 19:
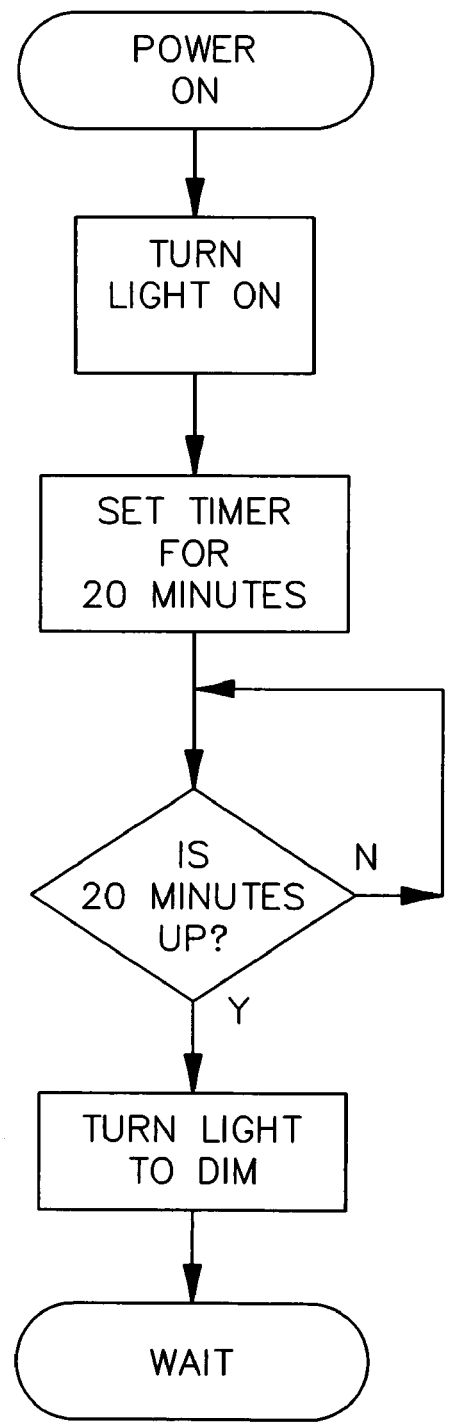
FIG. 19 is a graphical flowchart of the program of the device in FIG. 10 for turning the light to an ON state for period of time and then to a DIM state thereafter.
Figure 20:
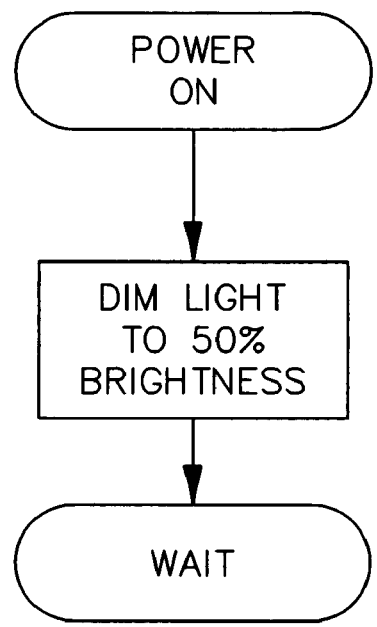
FIG. 20 is a graphical flowchart of the program of the device in FIG. 10 for dimming the light.

FIG. 12 shows the flowchart for one function implemented in the microcontroller 31 or a Programmable Logic Device. FIG. 10 is the electrical circuitry and FIG. 11 illustrates the waveform of the operation. With the program illustrated in FIG. 12, a continuous dimming function from 100% to OFF condition over any time period is achieved. The flowchart in FIG. 12 shows three timers. The first timer sets the time period when the light is fully ON to when the light is fully OFF such as thirty minutes. The second timer sets the time period for how long the light will be in each dimming position such as eight seconds. The third timer sets the time period from the zero crossing until the light is turned ON such as two milliseconds for one dimming setting. This example of two milliseconds can be represented of the third timer at time T1 of the cycle. When the third timer is a T3 of the cycle, the AC load would only be ON for about 25% of the time. This third timer is varied over the first timer's period from turning the light ON to full brightness to turning the light ON at the end of the full cycle is completed which is ⅟60 second for a 60 Hz AC power source. Each dimming setting will be ON for the duration of second timer. Also, the microcontroller 31 is programmable for several other functions. FIG. 13 shows the flowchart of another function implemented in the microcontroller which turns the light 600N and OFF randomly between time periods in minutes or hours. This simulates that the house is occupied and deters burglars from breaking into the home. FIG. 14 illustrates the function for flashing the light 60 between ON at full brightness and dim at a visually discernable rate, such as four seconds. If installed in the circuit for the porch light, this would bring attention to the house so that the pizza or other delivery services could easily locate the house. FIG. 15 illustrates the function for turning the lights to dim for a period of time such as twenty minutes and then OFF. This feature would allow parents to keep the light ON low for their children until they fell asleep and then automatically turn OFF to save energy. FIG. 16 illustrates a function for randomly turn the light 600N, OFF, and DIM at a high rate in seconds. This flickering effect would provide a party-type atmosphere. FIG. 17 illustrates a function to turn the lights OFF after a pre-set period of time such as ten minutes. FIG. 18 illustrates a function to turn the lights ON and OFF at a relatively high rate, such as a second, and sounds a beeper B1 while it is in an OFF cycle. If used on the front porch light would allow emergency personnel to locate the home more quickly and alert the occupants that the device is functioning by the sound. FIG. 19 illustrates a function for turning the light 60 on for a period of time such as twenty minutes and than dim thereafter. This would be used on lights to save energy, but not eliminate the lighting. FIG. 20 illustrates the program where light 60 is turned ON every half cycle providing a dimming function. All these functions are pre-programmed into the microcontroller's memory or into a Programmable Logic Device, and can be selected via the multi-position selection switch or via the program mode.

Figure 21:
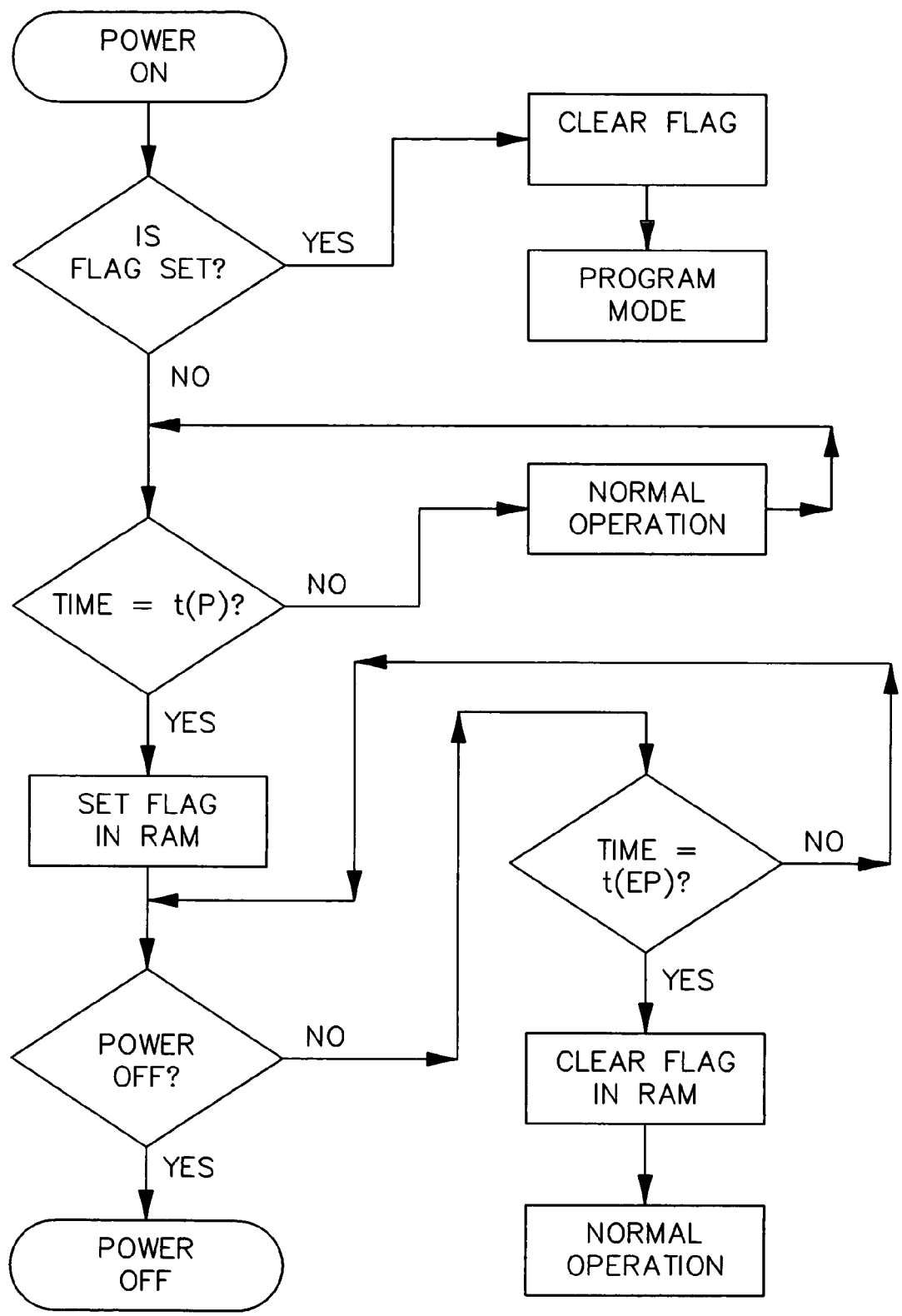
FIG. 21 is a graphical flowchart of the program of the device in FIG. 10 for re-programming the function.

FIG. 21 shows the flowchart for entering the program mode by turning the AC power controller 900N and OFF at the proper times. When the unit is first turned ON, the AC power controller 90 checks the internal RAM of the microcontroller 31 to see if a flag is set. If the flag is set, the AC power controller 38 enters the programming mode where the user can select one of the above programs.

The flag is set only if a certain t(P) has elapsed. If the AC power controller 90 is briefly turned OFF and then back ON when the flag is set, then the AC power controller 90 enters the programming mode. Once in the program mode, any function can be selected for a certain switch operation.

Figure 22A:
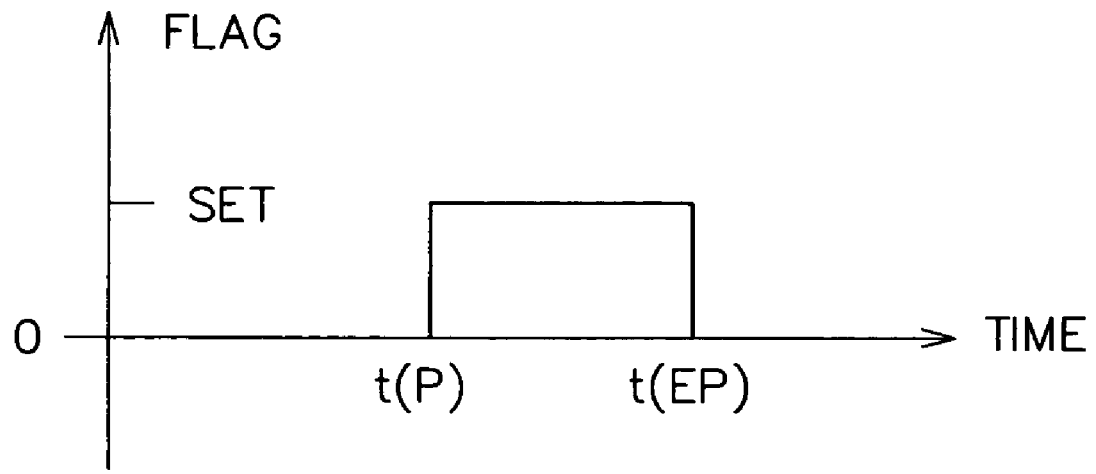
FIG. 22A is a graphical plot of time when the user can enter the program mode.
Figure 22B:
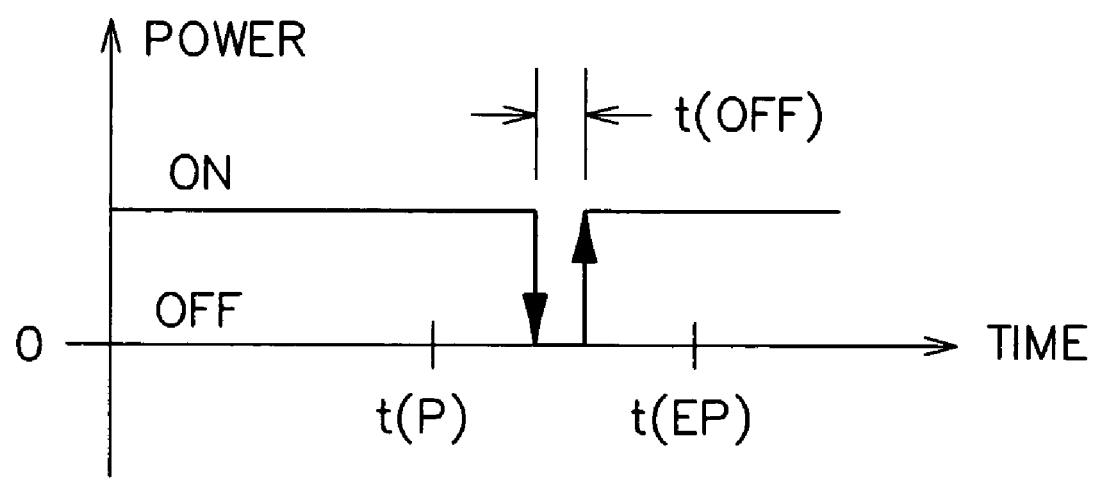
FIG. 22B is a graphical plot of time when the user switches the power to enter the program mode.

If the time ON exceeds a certain value, t(EP), then the flag is cleared and any OFF/ON sequence of power would not cause the AC power controller 90 to enter the programming mode. Also, the flag is changed if the AC power controller 90 is turned OFF longer then a certain period of time. The flag is stored in the microcontroller's internal RAM location, and if power is turned OFF longer then a certain period of time, the RAM location loses its set pattern. FIG. 22A shows when the flag is set during times t(P) and t(EP). If the power as shown in FIG. 22B is turned briefly OFF and then ON, then the AC power controller 90 enters the programming mode. If time t(OFF) is too long, then the flag is changed and any future power ON sequence from the AC power controller 90 would see the flag is not set.

g. Mounting Schemes

Figure 23:
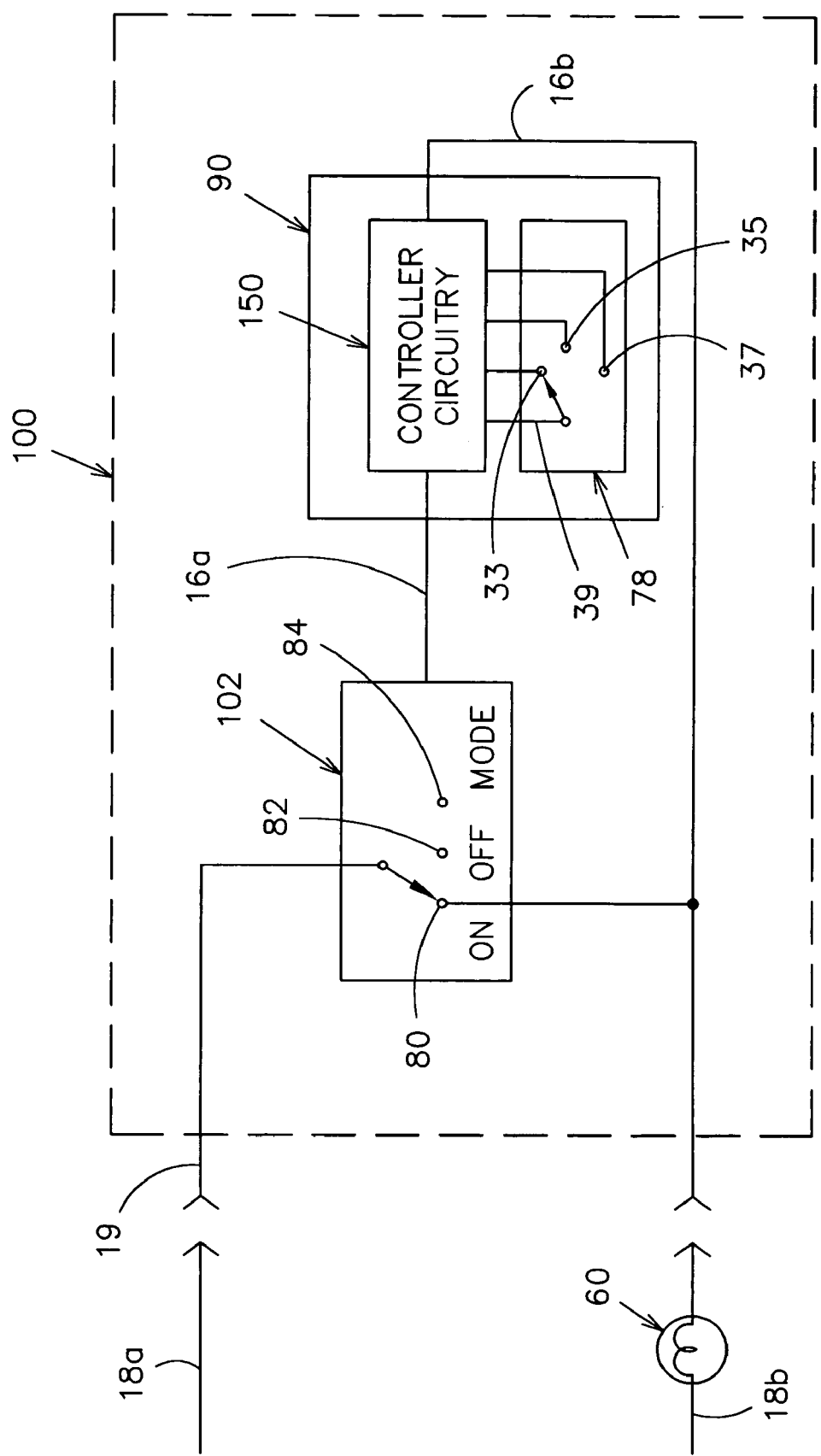
FIG. 23 is a block diagram showing a three-position switch combined with the AC power control circuit of FIG. 10.
Figure 24:
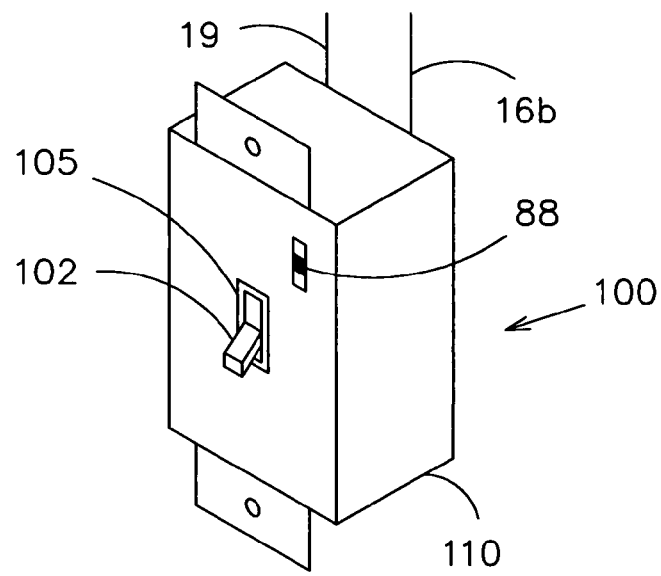
FIG. 24 is a perspective view showing an electrical switch box with the three-position switch and AC power control circuit of FIG. 23 house therein.
Figure 25:
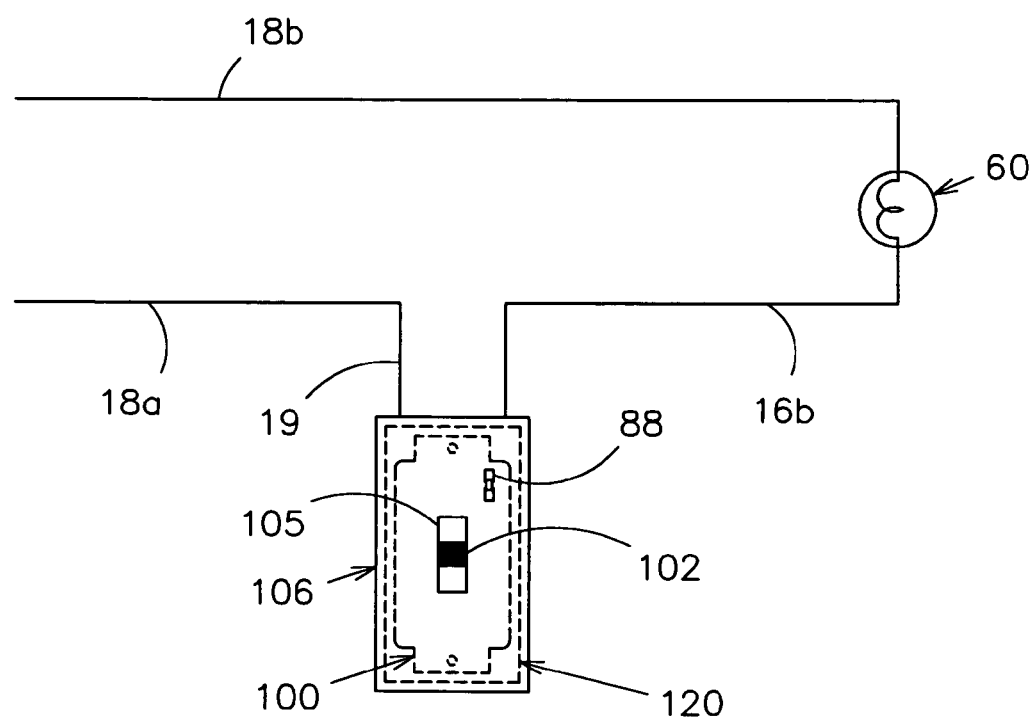
FIG. 25 is a perspective view showing an AC electrical system with the AC power control switch of FIG. 24 in series with the light, and the electrical wall box covered with a standard conventional wall plate.

One embodiment is to mount the AC power controller 90 with a three-position switch 102 to provide three levels of operation as shown in FIG. 23. The three levels of operation are the ON position 80, the OFF position 82, and the MODE position 84. In the MODE position 84, the AC power controller 90 operates the light in accordance with its programmed operation selected by mode selection switch 78 which is a multi-position switch. The position of the mode selection switch 78 determines the desired function. For example, select position 33 on the mode selection switch 78 would indicate to the controller circuitry 150 to implement the delay time off function. Similarly, selecting position 35 or selection 37 on the mode selection switch would indicate to the controller circuitry 150 another function. Lines 19 and 16b would connect the apparatus 100 which contain a three-position switch 102 and the AC power controller 90 to an electrical load such as the light 60. FIG. 24 shows the apparatus 100 with physical layout of the three-position switch 102, the multiple-position switch 88, the housing 110, and lines 19 and 16b. The three-position switch 102 is located in the center opening 105 for easy installation in an electrical wall box using standard wall plates. The center opening 105 has a height dimension of about 25 mm and a width dimension of about 10 mm, which corresponds with a standard toggle-switch wall plate. The multiple-position switch 88 is the physical realization of the mode selection switch 78 of FIG. 23. FIG. 25 shows the mounting of the apparatus 100 into an electrical wall box 120 and connected to light 60 and the AC power via lines 19 and 16b. The standard wall plate 106 covers the multiple-position switch 88, however; the three-position switch 102 mounted in the centered opening 105 would fit through the standard wall plate 106 and allow the operator to control the light 60 via the switch 102.

Figure 26:
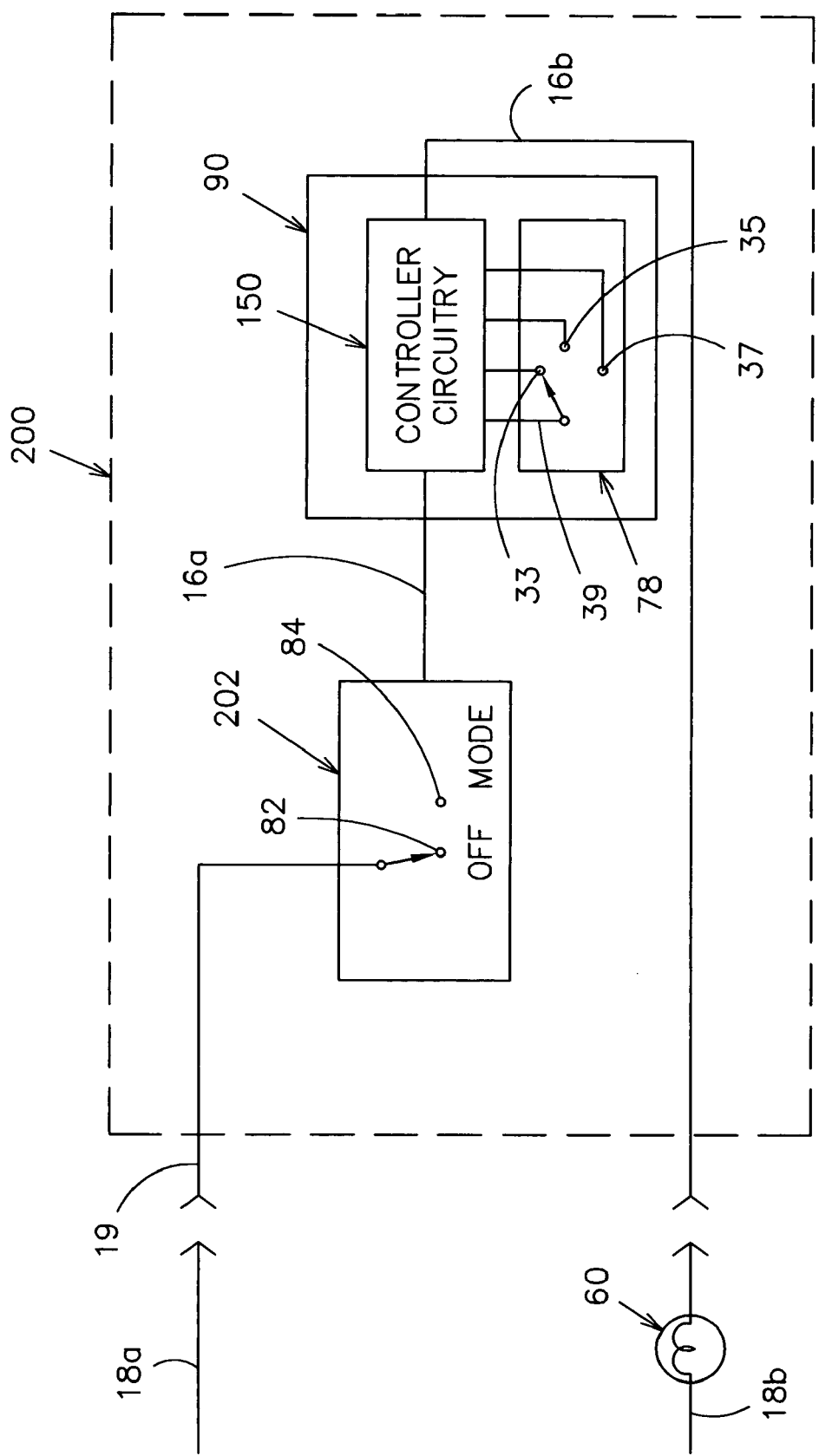
FIG. 26 is a block diagram showing a two-position switch, multi-position selection switch, and the AC power control circuit of FIG. 10.

Another embodiment is to use the AC power controller 90 with a single position on/off switch 202 and the mode selection switch 78. The apparatus 200 contains this combination as shown in FIG. 26. The mode selection switch 78 determines the desired function. The single position on/off switch 202 allows for the OFF position 82 and the MODE position 84. There are many configurations to mount the apparatus 200 into an electrical wall box and to provide the operator for easy selection of the desired functions.

Figure 27:
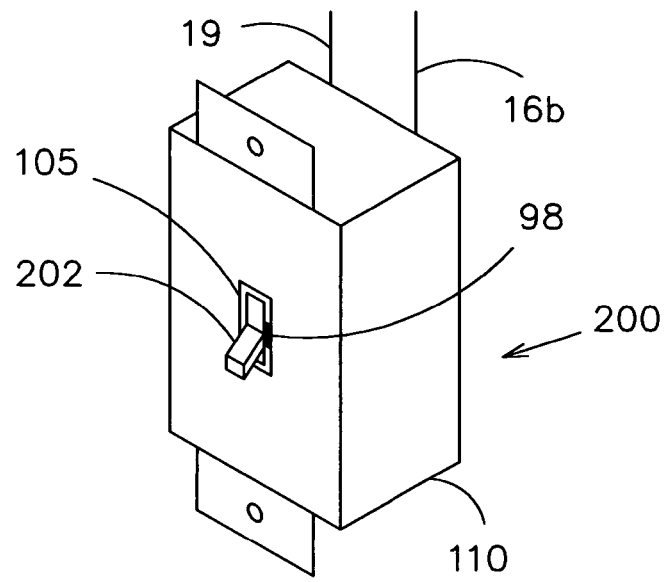
FIG. 27 is a perspective view showing an electrical switch box with the two-position switch and a multi-position selection switch in centered opening, and AC power control circuit of FIG. 26 house therein.
Figure 28:
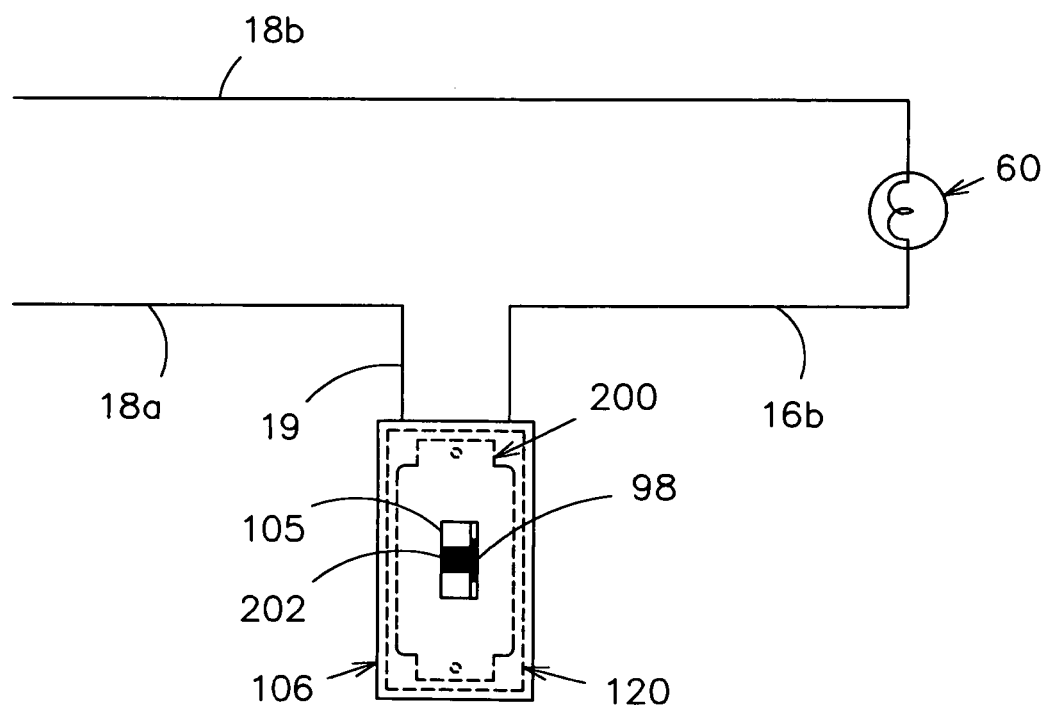
FIG. 28 is a perspective view showing an AC electrical system with the AC power control switch of FIG. 27 in series with the light, and the electrical wall box covered with a standard conventional wall plate.

One configuration is to mount the on/off switch 202 and the multiple position switch 98 into the center opening 105 of the housing 110 for easy installation in an electrical wall box using standard wall plates as in FIG. 27. The AC power controller 90 is mounted inside the housing with lines 19 and 16b connecting to AC power and electrical load. The multiple-position switch 98 is the physical realization of the mode selection switch 78 in FIG. 26. FIG. 28 show how the apparatus 200 mounts in an electrical wall box 120 with the multiple-position switch 98 adjacent to the on/off switch 202. The on/off switch 202 and the multiple-position switch 98 fits within the center opening 105 of a standard wall plate 106 which has a height dimension of about 25 mm and a width dimension of about 10 mm. The AC power switch 200, which is mounted in the electrical wall box, is covered with a standard switch wall plate 106. The user would select the desired function via multiple-position switch 98 and then turn the on/off switch 202 to the MODE position to get the desired operation.

Figure 29:
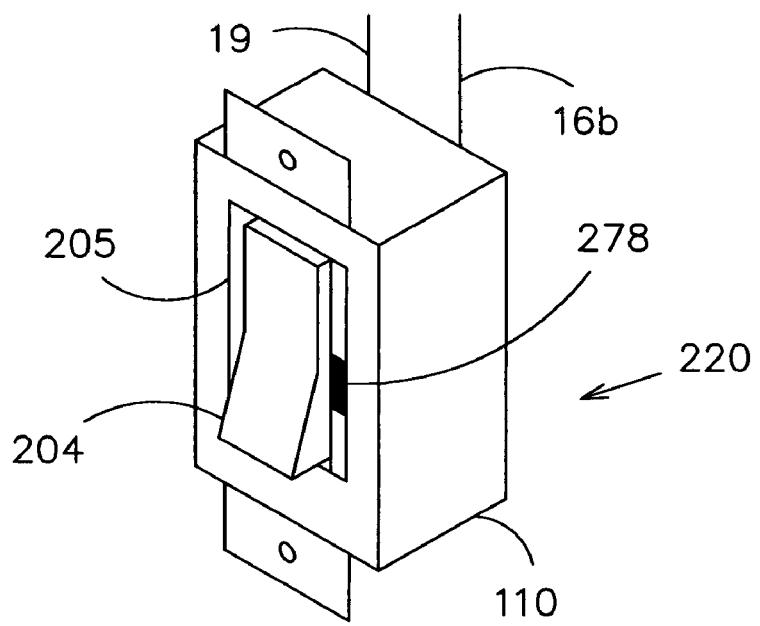
FIG. 29 is a perspective view showing an electrical switch box with the two-position rocker switch and a multi-position selection switch in centered opening, and AC power control circuit of FIG. 26 house therein.
Figure 30:
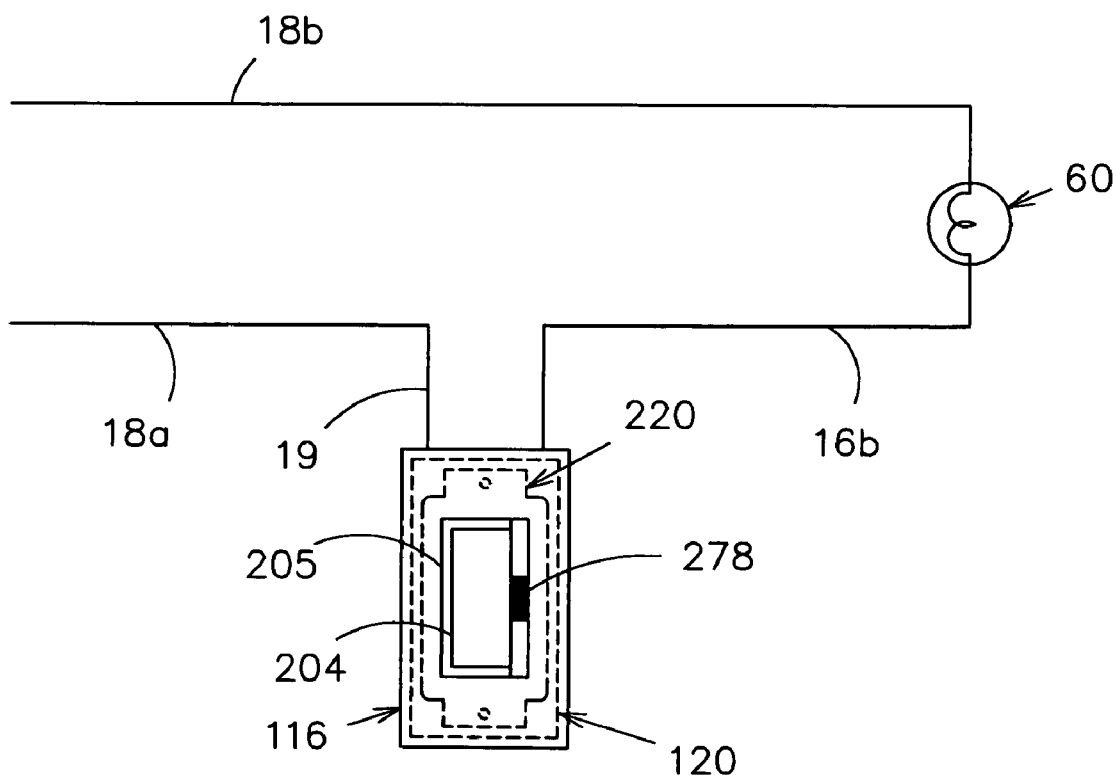
FIG. 30 is a perspective view showing an AC electrical system with the AC power control switch of FIG. 29 in series with the light, and the electrical wall box covered with a standard deluxe wall plate.

Another configuration is to mount a rocker actuated on/off switch 204 and a larger multiple position switch 278 into a larger center opening 205 in the housing 110 as shown in FIG. 29. The AC power controller 90 is mounted inside the housing with lines 19 and 16b connecting to AC power and electrical load. The larger multiple position switch 278 is the physical realization of the mode selection switch 78 of FIG. 26. The larger center opening 205 has a height dimension of about 67 mm and a width dimension of about 34 mm, which corresponds with a standard deluxe wall plate. With this arrangement, the apparatus 220 can be installed in an electrical wall box 120 and covered with a deluxe switch wall plate 116 as shown in FIG. 30.

Figure 31:
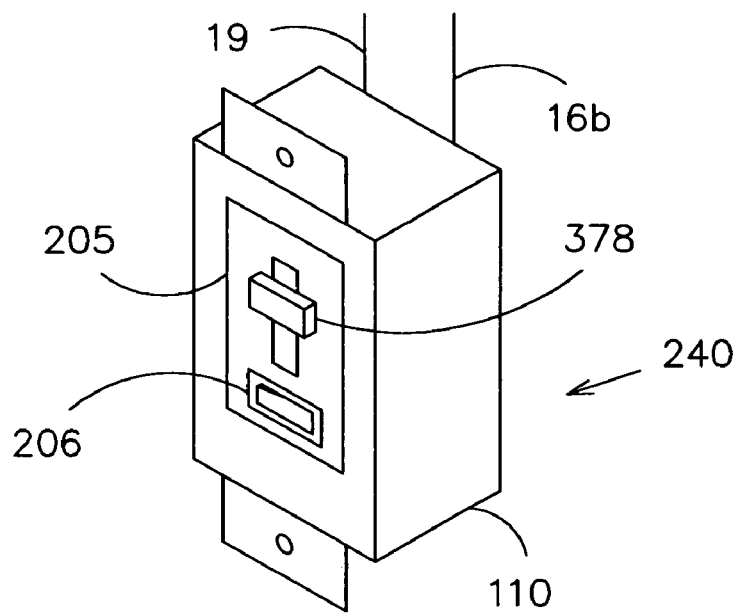
FIG. 31 is a perspective view showing an electrical switch box with the two-position toggle switch and a multi-position selection switch in centered opening with the toggle switch below the multi-position selection switch, and AC power control circuit of FIG. 26 house therein.
Figure 32:
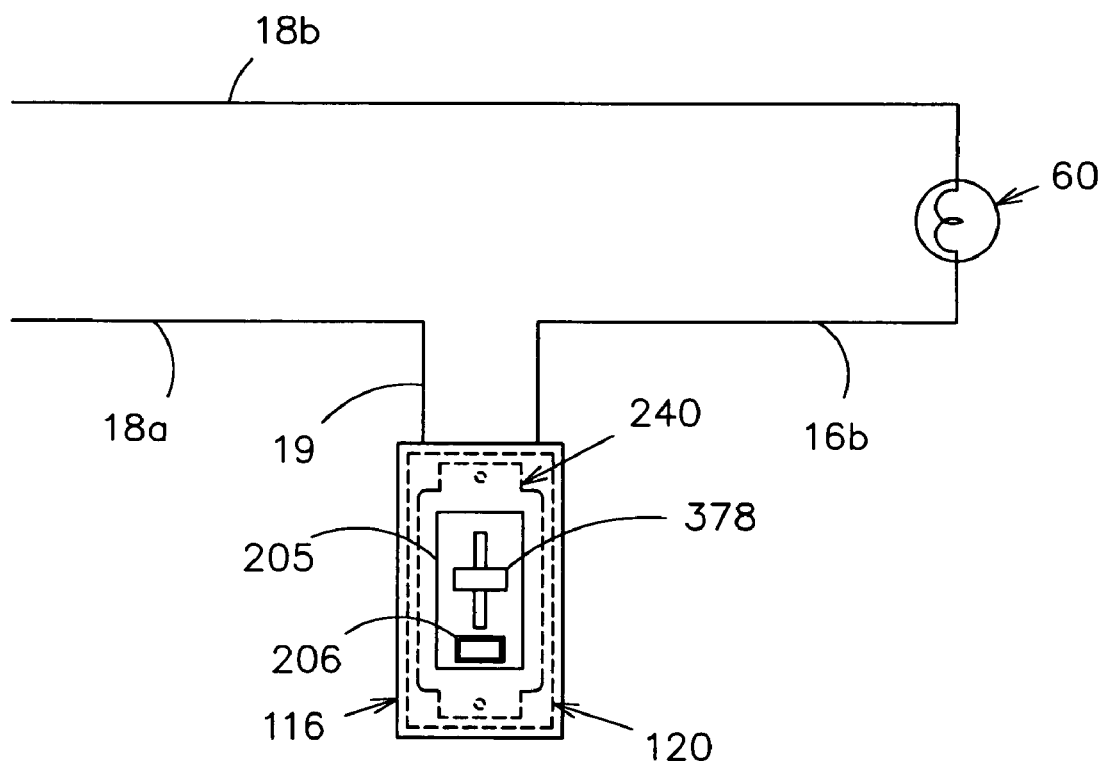
FIG. 32 is a perspective view showing an AC electrical system with the AC power control switch of FIG. 31 in series with the light, and the electrical wall box covered with a standard deluxe wall plate.

Another configuration is to mount a different on/off switch 206 and a wide-paddle, multiple-position switch 378 into a larger center opening 205 in the housing 110 as shown in FIG. 31. The larger center opening 205 has a height dimension of about 67 mm and a width dimension of about 34 mm, which corresponds with a standard deluxe wall plate. The AC power controller 90 is mounted inside the housing with lines 19 and 16b connecting to AC power and electrical load. With this arrangement, the apparatus 240 can be installed in an electrical wall box 120 and covered with a deluxe switch wall plate 116 as shown in FIG. 32.

Figure 33:
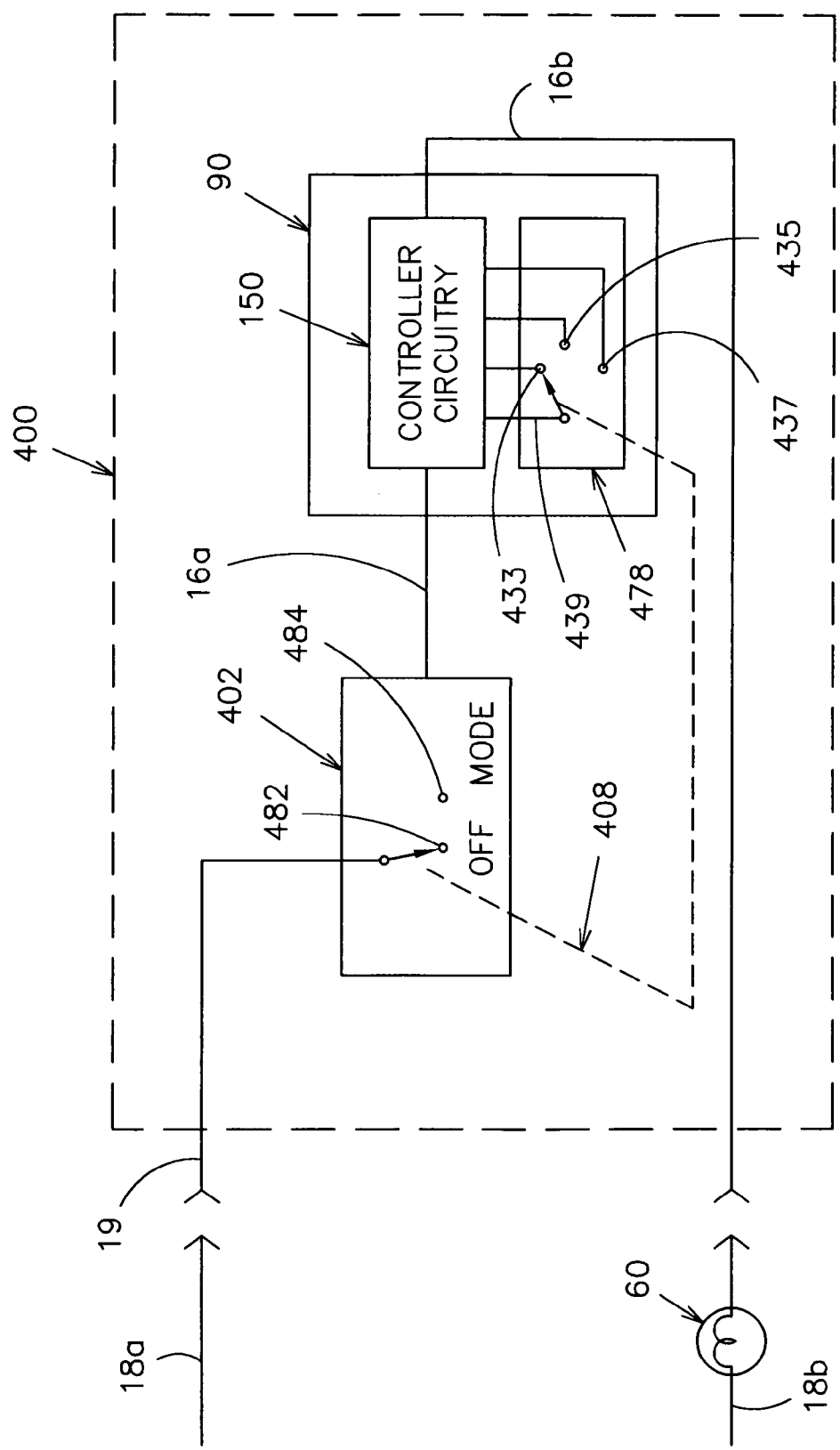
FIG. 33 is a block diagram showing a two-position switch and a multi-position selection switch aligned together, and the AC power control circuit of FIG. 10.

In another embodiment shown in FIG. 33 is to use the controller circuit 150 with a gang multiple-position switch 408. The gang multiple position switch 404 ties the on/off switch capability 402 with a multiple position switch 478. In the "off" position 482, no power flows through line 16a. In the "on" position 484, the controller circuit 150 is powered and the position of the multiple-position switch 478 selects the desired function. For example, selecting position 433 would cause the controller circuit to energize the attached electrical load such as a light 60 for a period of time. Similarly, selecting positions 435 or 437 would cause the controller circuit 150 to perform other desired functions. There are several mounting configurations for this embodiment.

Figure 34:
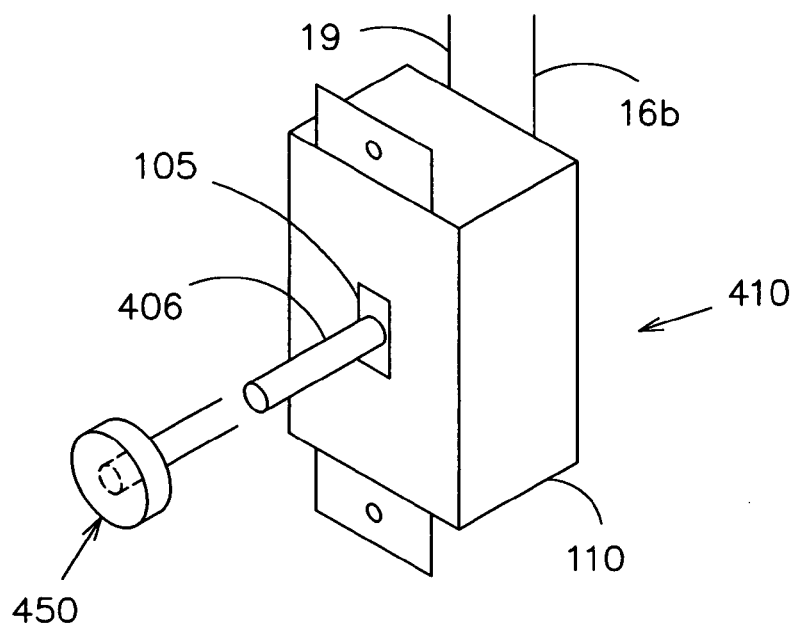
FIG. 34 is a perspective view showing an electrical switch box with a rotary switch in the centered opening, and AC power circuit of FIG. 33 house therein.
Figure 35:
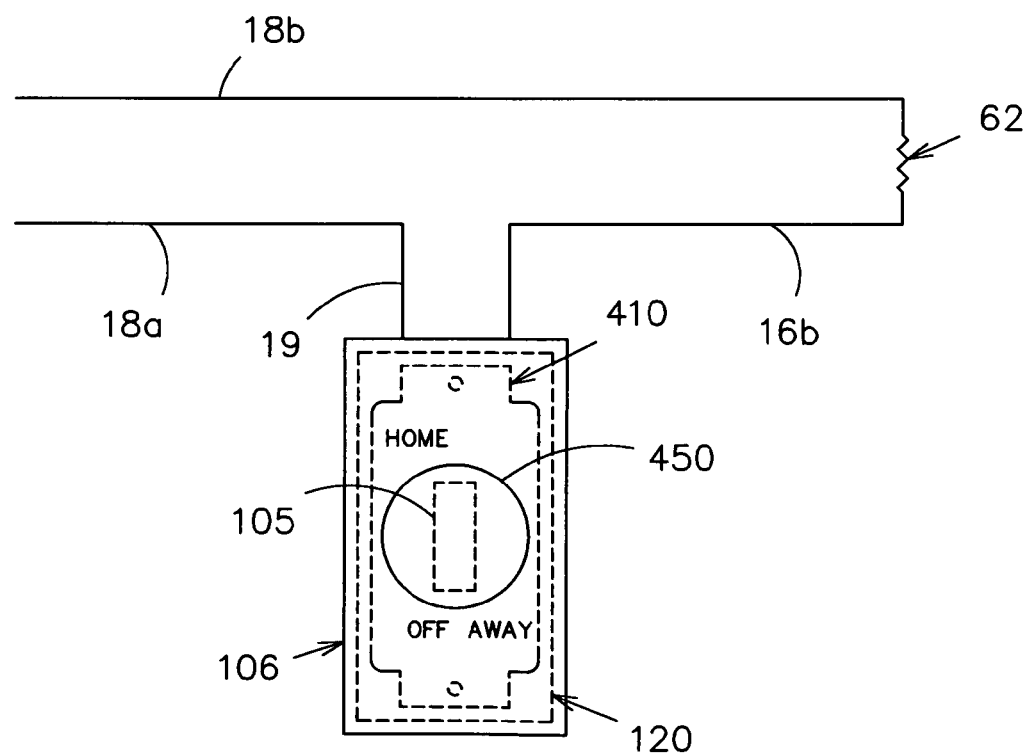
FIG. 35 is a perspective view showing an electrical system with AC power circuit of FIG. 34 in series with the heater, and the electrical wall box covered with a standard conventional wall plate.

One embodiment is to use a rotary switch 406 for the gang multiple position 408. The apparatus 410 contains the controller circuit 150 and a rotary multiple-position switch 406 mounted into the center opening 105 of the housing 110 for easy installation in an electrical wall box using standard wall plates as in FIG. 34. The center opening 105 has a height dimension of about 25 mm and a width dimension of about 10 mm, which corresponds with a standard toggle-switch wall plate. An external knob 450 attaches to the rotary switch shaft. In FIG. 35, the apparatus 410 is installed in the electrical wall box 120 and covered with a standard switch wall plate 106, and connected to a heater 62 and the AC power via lines 19 and 16b. The user would select the desired function via the knob 450 attached to the rotary switch 406. A brief description of the function can be applied to the wall plate 106 to indicate each switch position function as illustrated in FIG. 35.

Figure 36:
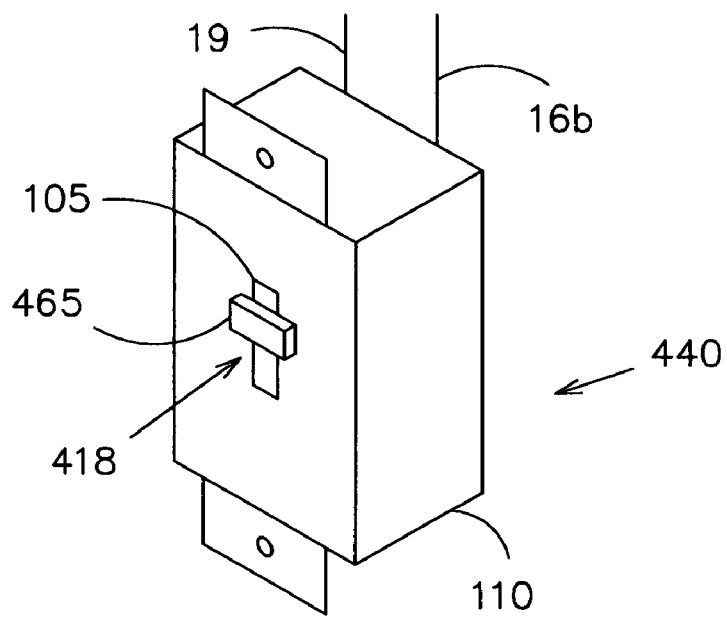
FIG. 36 is a perspective view showing an electrical switch box with a slider switch in the centered opening, and AC power circuit of FIG. 33 house therein.
Figure 37:
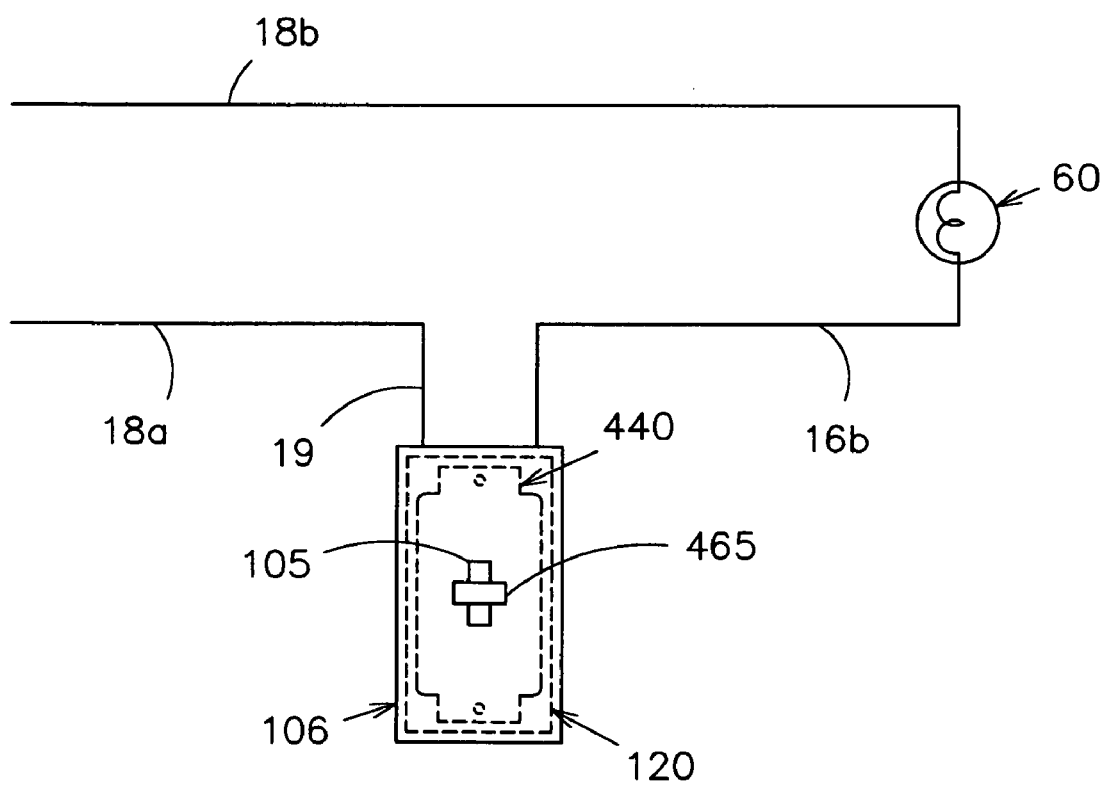
FIG. 37 is a perspective view showing an electrical system with AC power circuit of FIG. 36 in series with the light, and the electrical wall box covered with a standard conventional wall plate.

The preferred embodiment of the present invention is to use a slider switch 418 for the gang multiple position 408. The apparatus 440 which contains the controller circuit 150 and the slider switch 418 is mounted into the center opening 105 of the housing 110 for easy installation in an electrical wall box using standard wall plates as in FIG. 36. The center opening 105 has a height dimension of about 25 mm and a width dimension of about 10 mm, which corresponds with a standard toggle-switch wall plate. An external knob 465 attaches to the slider switch shaft. In FIG. 37, the apparatus 440 is installed in the electrical wall box 120 and covered with a standard switch wall plate 106, and connected to light 60 and the AC power via lines 19 and 16b. The knob 465 is installed after the standard wall plate 106. The user would select the desired function via the knob 465.

Other embodiments could use different types of multiple-position switches such as push-button multiple-position switch, a multiple-position toggle switch, a multiple-position lever switch, or a multiple-position rocker switch.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description.

What is claimed and desired to be secured by Letters Patent of the United States is:

1. An apparatus for selectively energizing a high-voltage AC electrical load, comprising:
   a) a switch housing having an opening located in correspondence with a central opening of standard wall plates; and
   b) switch means extended through and movable within said opening of said switch housing and coupled to means for selecting a pre-programmed function of said apparatus for selectively energizing said load.

2. The apparatus in claim 1, wherein said opening has a height dimension of about 25 mm and a width dimension of about 10 mm, which corresponds with a standard toggle-switch wall plate.

3. The apparatus in claim 1, wherein said opening has a height dimension of about 67 mm and a width dimension of about 34 mm, which corresponds with a standard rocker-switch wall plate.

4. The apparatus in claim 1, wherein said switch means is selected from a group of multi-position rotary switches, multi-position slide switches, multi-position push button switches, multi-position toggle switches, multi-position lever switches, and multi-position rocker switches.

5. The apparatus in claim 1, wherein said pre-programmed function is to selectively energized said AC load ON and OFF at random-time intervals.

6. The apparatus in claim 1, wherein said pre-programmed function is to selectively energize said AC load ON and to a state that is less than full ON at a periodic rate.

7. The apparatus in claim 1 wherein said pre-programmed function is to selectively energize said AC load ON for predetermined interval time and then OFF thereafter.

8. The apparatus in claim 1, wherein said pre-programmed function is to selectively energized said AC load ON for predetermined interval time and then slowly de-energized said AC load over a predetermined of time to an OFF state.

9. The apparatus in claim 1 wherein said pre-programmed function is to selectively energize said AC load to a state that is less than full ON for predetermined interval time and then OFF thereafter.

10. The apparatus in claim 1 wherein said pre-programmed function is to selectively energize said AC load to a state that is less than full ON.

11. An apparatus for selectively energizing a high-voltage AC electrical load, comprising:
   a) a housing having an opening located in correspondence with a central opening of a standard wall plate;
   b) first switch means mounted to said housing in said central opening having an "off" position and an "on" position; and
   c) Second switch means extended through and movable within said central opening and coupled to means for selecting a pre-programmed function of said apparatus for selectively energizing said load.

12. The apparatus in claim 11, wherein said opening has a height dimension of about 25 mm and a width dimension of about 10 mm, which corresponds with a standard toggle-switch wall plate.

13. The apparatus in claim 11, wherein said opening has a height dimension of about 67 mm and a width dimension of about 34 mm which corresponds with a standard rocker-switch wall plate.

14. The apparatus in claim 11, wherein said second switch means is selected from a group of multi-position rotary switches, multi-position slide switches, multi-position push button switches, multi-position toggle switches, multi-position lever switches, and multi-position rocker switches.

15. The apparatus in claim 11, wherein said pre-programmed function is to selectively energized said AC load ON and OFF at random-time intervals.

16. The apparatus in claim 11, wherein said pre-programmed function is to selectively energize said AC load ON and to a state that is less than full ON at a periodic rate.

17. The apparatus in claim 11, wherein said pre-programmed function is to selectively energize said AC load ON for predetermined interval time and then OFF thereafter.

18. The apparatus in claim 11, wherein said pre-programmed function is to selectively energized said AC load ON for predetermined interval time and then slowly de-energized said AC load over a predetermined of time to an OFF state.

19. The apparatus in claim 11, wherein said pre-programmed function is to selectively energize said AC load to a state that is less than full ON for predetermined interval time and then OFF thereafter.

20. The apparatus in claim 11, wherein said pre-programmed function is to selectively energize said AC load to a state that is less than full ON.

21. An apparatus for selectively energizing a high-voltage AC electrical load, comprising:
   a) a switch housing mountable within the interior of dwelling connected to the AC power supply and said AC electrical load;

b) first switch means mounted to said housing having an "off" position, and a "on" position;

c) control means mounted in said switch housing;

d) second switch means having plurality of positions mounted in the said housing for selecting different pre-programmed functions which are predefined in said control means;

e) means responsive to each position of said second switch means for completing and interrupting said circuit so as to permit flow of current through a thyristor connected in said leads so that said AC electrical load is energized and de-energized in accordance with said pre-programmed functions and when said first switch is in the "on" position; and f) means for deriving a source of constant DC voltage power from a small portion of every half AC cycle or full AC cycle, which appears across said thyristor and for supplying said constant DC voltage power to said control means.

22. The apparatus in claim 21, wherein said control means comprises a programmable microcontroller.

23. The apparatus in claim 22, wherein said programmable microcontroller contains non-volatile memory for storing said pre-programmed functions.

24. The apparatus in claim 21, wherein said functions are user programmable.

25. The apparatus in claim 21, wherein said second switch means is selected from a group of multi-position rotary switches, a multi-position slide switches, multi-position push button switches, multi-position toggle switches, multi-position lever switches, and multi-position rocker switches.

26. An apparatus for selectively energizing a high-voltage AC electrical load, comprising:

a) a switch housing mountable within the interior of dwelling connected to the AC power supply and said AC electrical load;

b) control means mounted in said switch housing;

c) switch means mounted to said housing having an "off" position and plurality of positions which selects different pre-programmed functions which are predefined in said control means;

d) means responsive to each other position of said switch means for completing and interrupting said circuit so as to permit flow of current through a thyristor connected in said leads so that said AC electrical load is energized and de-energized in accordance with said pre-programmed functions; and e) means for deriving a source of constant DC voltage power from a small portion of every half AC cycle or full AC cycle, which appears across said thyristor and for supplying said constant DC voltage power to said control means.

27. The apparatus in claim 26, wherein said control means comprises a programmable microcontroller.

28. The apparatus in claim 27, wherein said programmable microcontroller contains non-volatile memory for storing said pre-programmed functions.

29. The apparatus in claim 26, wherein said functions are user programmable.

30. The apparatus in claim 26, wherein said switch means is selected from a group of multi-position rotary switches, multi-position slide switches, multi-position push button switches, multi-position toggle switches, multi-position lever switches, and multi-position rocker switches.

* * * * *